US012641237B2

(12) United States Patent
Hendry

(10) Patent No.: US 12,641,237 B2
(45) Date of Patent: May 26, 2026

(54) METHOD AND DEVICE FOR GENERATING/RECEIVING MEDIA FILE ON BASIS OF EOS SAMPLE GROUP, AND METHOD FOR TRANSMITTING MEDIA FILE

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 18/287,527

(22) PCT Filed: Apr. 19, 2022

(86) PCT No.: PCT/KR2022/005605
§ 371 (c)(1),
(2) Date: Oct. 19, 2023

(87) PCT Pub. No.: WO2022/225306
PCT Pub. Date: Oct. 27, 2022

(65) Prior Publication Data
US 2024/0205409 A1 Jun. 20, 2024

Related U.S. Application Data

(60) Provisional application No. 63/180,024, filed on Apr. 26, 2021, provisional application No. 63/176,355, filed on Apr. 19, 2021.

(51) Int. Cl.
*H04N 19/132* (2014.01)
*G06F 16/75* (2019.01)
(Continued)

(52) U.S. Cl.
CPC ........... *H04N 19/132* (2014.11); *G06F 16/75* (2019.01); *H04N 19/136* (2014.11); *H04N 19/188* (2014.11); *H04N 19/70* (2014.11)

(58) Field of Classification Search
CPC ............. H04N 21/85406; H04N 19/70; H04N 19/188; H04N 19/46; H04N 19/184;
(Continued)

(56) References Cited

U.S. PATENT DOCUMENTS

| | | | |
|---|---|---|---|
| 2015/0373345 A1* | 12/2015 | Ramasubramonian | ...................... H04N 19/105 375/240.26 |
| 2020/0154116 A1* | 5/2020 | Wang ................ H04N 21/85406 |
| 2021/0185359 A1* | 6/2021 | Choi ...................... H04N 19/30 |

FOREIGN PATENT DOCUMENTS

| | | |
|---|---|---|
| KR | 10-2019-0010557 | 1/2019 |
| KR | 10-2019-0013763 | 2/2019 |

(Continued)

OTHER PUBLICATIONS

Wang et al., "AHG9: On EOS NAL units," JVET-S0155-v1, Joint Video Experts Team (JVET) of ITU-T SG 16 WP 3 and ISO/IEC JTC 1/SC 29/WG 11, 19th Meeting: by teleconference, Jun. 22-Jul. 1, 2020, 5 pages.

(Continued)

*Primary Examiner* — Neil R Mikeska
(74) *Attorney, Agent, or Firm* — Fish & Richardson P.C.

(57) ABSTRACT

Disclosed herein are a media file generation/receiving method based on an EOS sample group and a method of transmitting a media file. The media file receiving method may comprise obtaining one or more tracks and a sample group from a media file and reconstructing an access unit based on samples in the tracks and the sample group. The sample group may comprise a first sample group including end of sequence (EOS) information of video data to which the access unit belongs, and the first sample group may comprise one or more EOS NAL units and a first syntax element related to the number of EOS NAL units.

13 Claims, 11 Drawing Sheets

(51) Int. Cl.
*H04N 19/136* (2014.01)
*H04N 19/169* (2014.01)
*H04N 19/70* (2014.01)

(58) Field of Classification Search
CPC ......... H04N 19/132; H04N 21/234327; H04N 21/440227; H04N 19/136; G06F 16/75
See application file for complete search history.

(56) References Cited

FOREIGN PATENT DOCUMENTS

| | | |
|---|---|---|
| KR | 10-2115323 | 5/2020 |
| WO | WO 2016/130635 A1 | 8/2016 |
| WO | WO 2017/205325 A1 | 11/2017 |

OTHER PUBLICATIONS

Skupin et al., "AHG9: Miscellaneous cleanups," JVET-S0174, Joint Video Experts Team (JVET) of ITU-T SG 16 WP 3 and ISO/IEC JTC 1/SC 29/WG 11, 19th Meeting: by teleconference, Jun. 22-Jul. 1, 2020, 6 pages.

ISO/IEC, "Draft FDIS stage: Information technology—Coding of audio-visual objects—Part 15: Carriage of network abstraction layer (NAL) unit structured video in the ISO base media file format," ISO/IEC 14496-15:2021(E), ISO/IEC JTC 1/SC 29/WG 03, Secretariat: JISC, 283 pages.

Office Action in Korean Appln. No. 10-2023-7039407, mailed on Feb. 7, 2025, 5 pages.

[No Author Listed], "Information technology—Coding of audio-visual objects—Part 15: Carriage of network abstraction layer (NAL) unit structured video in the ISO base media format," ISO/IEC 14496-15:2021(E), ISO/IEC JTC 1/SC 29/ WG 03, Retrieved on Mar. 2, 2021 282 pages.

Extended European Search Report in European Appln. No. 22792006. 3, mailed on Jul. 24, 2024, 10 pages.

Kammachi-Sreedhar et al. "VVC multi-layer stream and sample definitions," MPEG Meeting; Apr. 20, 2020-Apr. 24, 2020, Motion Picture Expert Group or ISO/IEC JTC1/SC29/WG11, M53483, retrieved on Apr. 22, 2020, 10 pages.

Notice of Allowance in Japanese Appln. No. 2023-562298, mailed on Nov. 19, 2024, 4 pages.

* cited by examiner

```
class EndOfSequenceSampleEntry() extends VisualSampleGroupEntry ('eos ')

{ unsigned int(9) ols_idx;

unsigned int(3) max_tid;

unsigned int(1) lower_ols_idx_inclusive;

unsigned int(11) eos_position;

bit(16) eosNalUnit;

}
```

```
class EndOfSequenceSampleEntry() extends VisualSampleGroupEntry ('eos ')

{ unsigned int(9) ols_idx;

unsigned int(3) max_tid;

unsigned int(1) lower_ols_idx_inclusive;

unsigned int(3) reserved;

unsigned int(8) num_eos_nal_unit_minus1;

for (i=0; i <= num_eos_nal_unit_minus1; i++) { unsigned int(16) eos_position[ i ];

bit(16) eosNalUnit[ i ];

```
class EndOfSequenceSampleEntry() extends VisualSampleGroupEntry ('eos ')

{ unsigned int(9) ols_idx;

unsigned int(3) max_tid;

unsigned int(1) lower_ols_idx_inclusive;

unsigned int(3) reserved;

unsigned int(8) num_eos_nal_unit_minus1;

for (i=0; i  <=  num_eos_nal_unit_minus1; i++) { unsigned int(16) delta_eos_position[ i ];

bit(16) eosNalUnit[ i ];

```
class EndOfSequenceSampleEntry() extends VisualSampleGroupEntry ('eos ')

{ unsigned int(9) ols_idx;

unsigned int(3) max_tid;

unsigned int(1) lower_ols_idx_inclusive;

unsigned int(3) reserved;

unsigned int(8) num_eos_nal_unit_minus1;

for (i=0; i  <=  num_eos_nal_unit_minus1; i++) { bit(16) eosNalUnit[ i ];

}

}
```

METHOD AND DEVICE FOR GENERATING/RECEIVING MEDIA FILE ON BASIS OF EOS SAMPLE GROUP, AND METHOD FOR TRANSMITTING MEDIA FILE

CROSS-REFERENCE TO RELATED APPLICATIONS

This application is a National Stage application under 35 U.S.C. § 371 of International Application No. PCT/KR2022/005605, filed on Apr. 19, 2022, which claims the benefit of U.S. Provisional Application No. 63/176,355, filed on Apr. 19, 2021, and U.S. Provisional Application No. 63/180,024, filed on Apr. 26, 2021. The disclosures of the prior applications are incorporated by reference in their entirety.

TECHNICAL FIELD

The present disclosure relates to a method and apparatus for generating/receiving a media file based on an EOS sample group, and more particularly, to a method and apparatus for generating/receiving a media file based on an EOS sample group including a plurality of EOS NAL units, and a method of transmitting a media file generated by the method/apparatus for generating the media file of the present disclosure.

BACKGROUND

Recently, the demand for high-resolution and high-quality images such as 360-degree images is increasing. As the resolution or quality of an image increases, a file capacity or a frame rate increases, which inevitably increases storage cost and transmission cost. In addition, as mobile devices such as smartphones and tablet PCs become popular, the demand for multimedia services based on communication networks is rapidly increasing. However, there is a problem that hardware and network resources for multimedia services are limited.

Accordingly, there is a need for high-efficiency image compression and file processing technologies for more effectively storing and transmitting image data.

SUMMARY

An object of the present disclosure is to provide a method and apparatus for generating/receiving a media file based on an EOS sample group.

An object of the present disclosure is to provide a method and apparatus for generating/receiving a media file based on an EOS sample group including a plurality of EOS NAL units.

An object of the present disclosure is to provide a method and apparatus for generating/receiving a media file based on an EOS sample group including information on the number of EOS NAL units.

An object of the present disclosure is to provide a method and apparatus for generating/receiving a media file based on an EOS sample group supporting an elementary stream having multiple layers.

An object of the present disclosure is to provide a method of transmitting a media file generated by a media file generating method or apparatus according to the present disclosure.

An object of the present disclosure is to provide a recoding medium storing a media file generated by a media file generating method or apparatus according to the present disclosure.

An object of the present disclosure is to provide a recording medium storing a media file received by a media file receiving apparatus according to the present disclosure and used to reconstruct an image.

The technical problems solved by the present disclosure are not limited to the above technical problems and other technical problems which are not described herein will become apparent to those skilled in the art from the following description.

A media file receiving method according to an aspect of the present disclosure may comprise obtaining one or more tracks and a sample group from a media file and reconstructing an access unit based on samples in the tracks and the sample group. The sample group may comprise a first sample group including end of sequence (EOS) information of video data to which the access unit belongs, and the first sample group may comprise one or more EOS NAL units and a first syntax element related to the number of EOS NAL units.

A media file receiving apparatus according to another aspect of the present disclosure may comprise a memory and at least one processor. The at least one processor may obtain one or more tracks and a sample group from a media file and reconstruct an access unit based on samples in the tracks and the sample group. The sample group may comprise a first sample group including end of sequence (EOS) information of video data to which the access unit belongs, and the first sample group may comprise one or more EOS NAL units and a first syntax element related to the number of EOS NAL units.

A media file generating method according to another aspect of the present disclosure may comprise encoding video data including an access unit, generating a first sample group including end of sequence (EOS) information of the encoded video data and generating a media file based on the encoded video data and the first sample group. The first sample group may comprise one or more EOS NAL units and a first syntax element related to the number of EOS NAL units.

A media file generating apparatus according to another aspect of the present disclosure may comprise a memory and at least one processor. The at least one processor may encode video data including an access unit, generate a first sample group including end of sequence (EOS) information of the encoded video data and generate a media file based on the encoded video data and the first sample group. The first sample group may comprise one or more EOS NAL units and a first syntax element related to the number of EOS NAL units.

In a media file transmitting method according to another aspect of the present disclosure, a media file generated by the media file generating method or apparatus of the present disclosure may be transmitted.

A computer-readable recording medium according to another aspect of the present disclosure may store a media file generated by the media file generating method or apparatus of the present disclosure.

The features briefly summarized above with respect to the present disclosure are merely exemplary aspects of the detailed description below of the present disclosure, and do not limit the scope of the present disclosure.

According to the present disclosure, it is possible to provide a method and apparatus for generating/receiving a media file based on an EOS sample group.

Also, according to the present disclosure, it is possible to provide a method and apparatus for generating/receiving a media file based on an EOS sample group including a plurality of EOS NAL units.

Also, according to the present disclosure, it is possible to provide a method and apparatus for generating/receiving a media file based on an EOS sample group including information on the number of EOS NAL units.

Also, according to the present disclosure, it is possible to provide a method and apparatus for generating/receiving a media file based on an EOS sample group supporting an elementary stream having multiple layers.

According to the present disclosure, it is possible to provide a method of transmitting a media file generated by a media file generating method or apparatus according to the present disclosure.

According to the present disclosure, it is possible to provide a recoding medium storing a media file generated by a media file generating method or apparatus according to the present disclosure.

According to the present disclosure, it is possible to provide a recording medium storing a media file received by a media file receiving apparatus according to the present disclosure and used to reconstruct an image.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 13 is a view illustrating a syntax structure of an EOS sample group entry according to another embodiment of the present disclosure.

FIG. 14 is a view illustrating a syntax structure of an EOS sample group entry according to another embodiment of the present disclosure.

DETAILED DESCRIPTION

Figure 1:
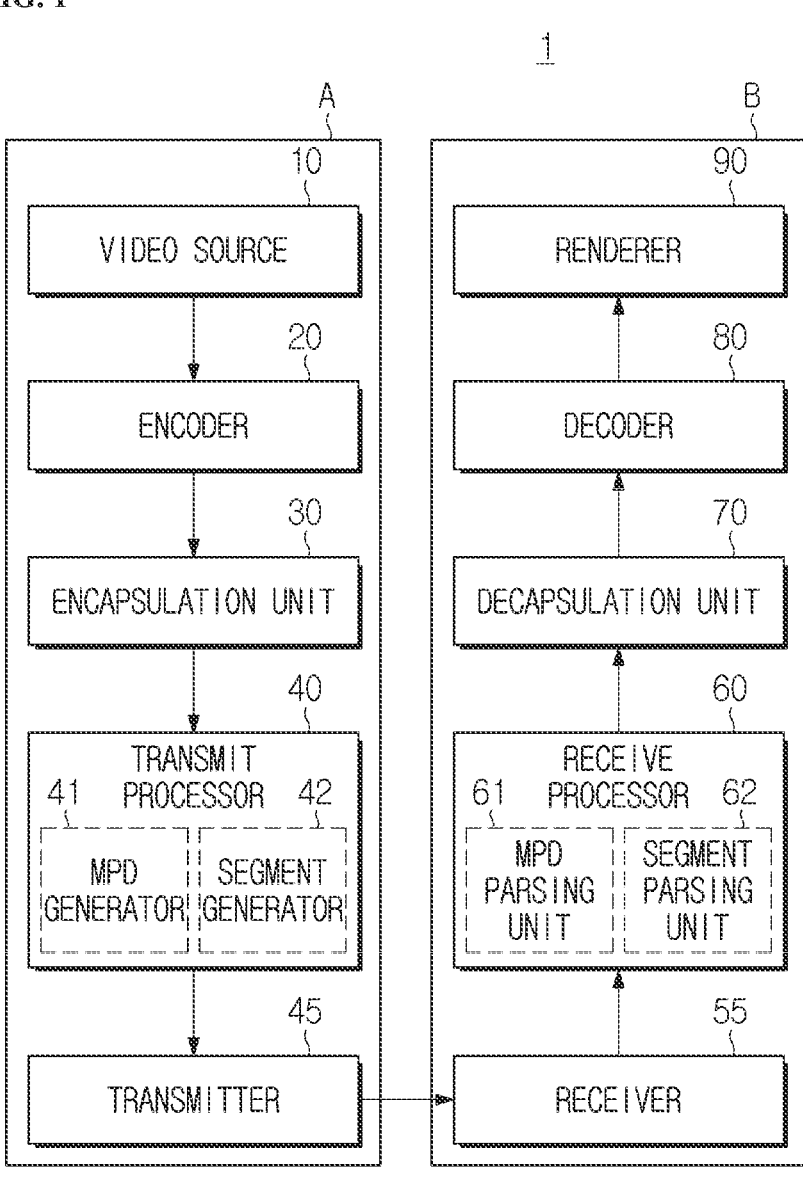
FIG. 1 is a view schematically illustrating a media file transmission/receiving system according to an embodiment of the present disclosure.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Media File Transmission/Receiving System

FIG. 1 is a view schematically illustrating a media file transmission/receiving system according to an embodiment of the present disclosure.

Referring to FIG. 1, the media file transmission/receiving system 1 may include a transmitting apparatus A and a receiving apparatus B. In some embodiments, the media file transmission/receiving system 1 may support adaptive streaming based on MPEG-DASH (dynamic adaptive streaming over HTTP), thereby supporting seamless media content reproduction.

The transmitting apparatus A may include a video source 10, an encoder 20, an encapsulation unit 30, a transmit processor 40 and a transmitter 45.

The video source 10 may generate or obtain media data such as video or image. To this end, the video source 10 may include a video/image capture device and/or a video/image generating device or may be connected to an external device to receive media data.

The encoder 20 may encode media data received from the video source 10. The encoder 20 may perform a series of procedures such as prediction, transform, and quantization according to a video codec standard, for example, a Versatile Video Coding (VVC) standard, for compression and encoding efficiency. The encoder 20 may output the encoded media data in the form of a bitstream.

The encapsulation unit 30 may encapsulate the encoded media data and/or media data related metadata. For example, the encapsulation unit 30 may encapsulate the data in a file format such as ISO Base Media File Format (ISO BMFF) or Common Media Application Format (CMAF), or process the data in the form of segments. Media data (hereinafter, referred to as a 'media file') encapsulated in the form of a file may be stored in a storage unit (not shown) in some embodiments. The media file stored in the storage unit may be read by the transmit processor 40 and transmitted to the receiving apparatus B according to an on demand, non-real time (NRT) or broadband method.

The transmit processor 40 may generate an image signal by processing the media file according to an arbitrary transmitting method. The media file transmitting method may include a broadcast method and a broadband method.

According to the broadcast method, the media file may be transmitted using an MPEG Media Transport (MMT) protocol or a Real time Object delivery over Unidirectional Transport (ROUTE) protocol. The MMT protocol may be a transport protocol supporting media streaming regardless of a file format or codec in an IP-based network environment. In the case of using the MMT protocol, the media file may be processed in Media Processing Units (MPUs) based on MMT and then transmitted according to the MMT protocol. The ROUTE protocol is an extension of File Delivery over Unidirectional Transport (FLUTE), and may be a transport protocol supporting real-time transmission of media files. In the case of using the ROUTE protocol, the media file may be processed into one or more segments based on MPEG-DASH and then transmitted according to the ROUTE protocol.

According to the broadband method, the media file may be transmitted through a network using HTTP (HyperText Transfer Protocol). Information transmitted through HTTP may include signaling metadata, segment information, and/ or Non-Real Time (NRT) service information.

In some embodiments, the transmit processor 40 may include an MPD generator 41 and a segment generator 42 to support adaptive media streaming.

The MPD generator 41 may generate a Media Presentation Description (MPD) based on the media file. The MPD is a file including detailed information on media presentation, and may be expressed in an XML format. The MPD may provide signaling metadata, such as an identifier for each segment. In this case, the receiving apparatus B may dynamically obtain segments based on the MPD.

The segment generator 42 may generate one or more segments based on the media file. The segment may include actual media data and may have a file format such as ISO BMFF. The segment may be included in the representation of an image signal, and, as described above, may be identified based on the MPD.

In addition, the transmit processor 40 may generate an image signal according to the MPEG-DASH standard based on the generated MPD and segment.

The transmitter 45 may transmit the generated image signal to the receiving apparatus B. In some embodiments, the transmitter 45 may transmit an image signal to the receiving apparatus B through an IP network according to the MMT standard or the MPEG-DASH standard. According to the MMT standard, the image signal transmitted to the receiving apparatus B may include a presentation information document (PI) including reproduction information of the media data. According to the MPEG-DASH standard, the image signal transmitted to the receiving apparatus B may include the aforementioned MPD as reproduction information of the media data. However, in some embodiments, the MPD and the segment may be individually transmitted to the receiving apparatus B. For example, a first image signal including the MPD may be generated by the transmitting apparatus A or an external server and transmitted to the receiving apparatus B, and a second image signal including the segment may be generated by the transmitting apparatus A and may be transmitted to the receiving apparatus B.

Meanwhile, although the transmit processor 40 and the transmitter 45 are illustrated as separate elements in FIG. 1, they may be integrally implemented as a single element in some embodiments. Also, the transmit processor 40 may be implemented as an external device (e.g., DASH server) separate from the transmitting apparatus A. In this case, the transmitting apparatus A may operate as a source apparatus generating a media file by encoding the media data, and the external apparatus may operate as a server apparatus generating an image signal by processing the media data according to an arbitrary transmission protocol.

Next, the receiving apparatus B may include a receiver 55, a receive processor 60, a decapsulation unit 70, a decoder 80, and a renderer 90. In some embodiments, the receiving apparatus B may be an MPEG-DASH-based client.

The receiver 55 may receive an image signal from the transmitting apparatus A. The image signal according to the MMT standard may include a PI document and a media file. In addition, the image signal according to the MPEG-DASH standard may include an MPD and a segment. In some embodiments, the MPD and the segment may be separately transmitted through different image signals.

The receive processor 60 may extract/parse a media file by processing the received image signal according to a transport protocol.

In some embodiments, the receive processor 60 may include an MPD parsing unit 61 and a segment parsing unit 62 in order to support adaptive media streaming.

The MPD parsing unit 61 may obtain an MPD from the received image signal, and parse the obtained MPD to generate a command required for obtaining a segment. Also, the MPD parsing unit 61 may obtain media data reproduction information, for example, color conversion information, based on the parsed MPD.

The segment parsing unit 62 may obtain a segment based on the parsed MPD and parse the obtained segment to extract the media file. In some embodiments, the media file may have a file format such as ISO BMFF or CMAF.

The decapsulation unit 70 may decapsulate the extracted media file to obtain media data and metadata related thereto.

The obtained metadata may have the form of a box or track in a file format. In some embodiments, the decapsulation unit 70 may receive metadata required for decapsulation from the MPD parsing unit 61.

The decoder 80 may decode the obtained media data according to a video codec standard, for example, a VVC standard. To this end, the decoder 80 may perform a series of procedures such as inverse quantization, inverse transform, and prediction corresponding to operation of the encoder 20.

The renderer 90 may render media data such as the decoded video or image. The rendered media data may be reproduced through a display unit (not shown).

Hereinafter, a media file transmission/receiving method will be described in detail.

Figure 2:
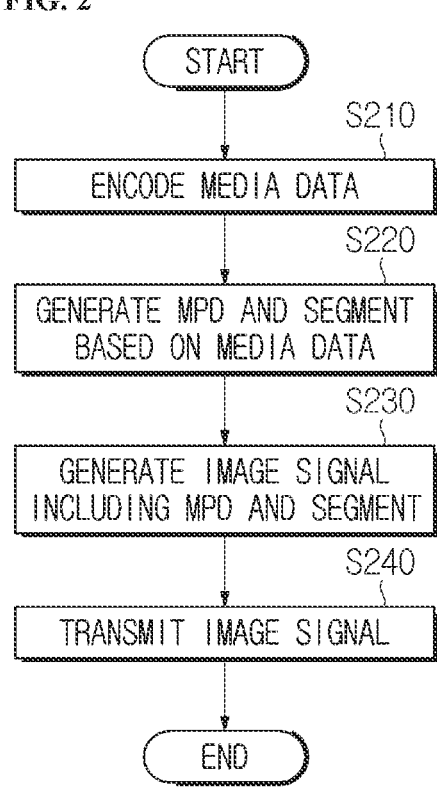
FIG. 2 is a flowchart illustrating a media file transmitting method.

FIG. 2 is a flowchart illustrating a media file transmitting method.

In one example, each step of FIG. 2 may be performed by the transmitting apparatus A of FIG. 1. Specifically, step S210 may be performed by the encoder 20 of FIG. 1. Also, steps S220 and S230 may be performed by the transmit processor 40. Also, step S240 may be performed by the transmitter 45.

Referring to FIG. 2, the transmitting apparatus may encode media data such as a video or an image (S210). The media data may be captured/generated by the transmitting apparatus or obtained from an external device (e.g., camera, video archive, etc.). Media data may be encoded in the form of a bitstream according to a video codec standard, for example, a VVC standard.

The transmitting apparatus may generate an MPD and one or more segments based on the encoded media data (S220). The MPD may include detailed information about media presentation as described above. The segment may contain actual media data. In some embodiments, the media data may be encapsulated in a file format such as ISO BMFF or CMAF and included in a segment.

The transmitting apparatus may generate an image signal including the generated MPD and segment (S230). In some embodiments, the image signal may be individually generated for each of the MPD and segment. For example, the transmitting apparatus may generate a first image signal including an MPD and generate a second image signal including a segment.

The transmitting apparatus may transmit the generated image signal to the receiving apparatus (S240). In some embodiments, the transmitting apparatus may transmit the image signal using a broadcast method. In this case, the MMT protocol or the ROUTE protocol may be used. Alternatively, the transmitting apparatus may transmit the image signal using a broadband method.

Meanwhile, although, in FIG. 2, the MPD and an image signal including the same are described as being generated and transmitted by the transmitting apparatus (steps S220 to S240), in some embodiments, the MPD and an image including the same may be generated and transmitted by an external server different from the transmitting apparatus.

Figure 3:
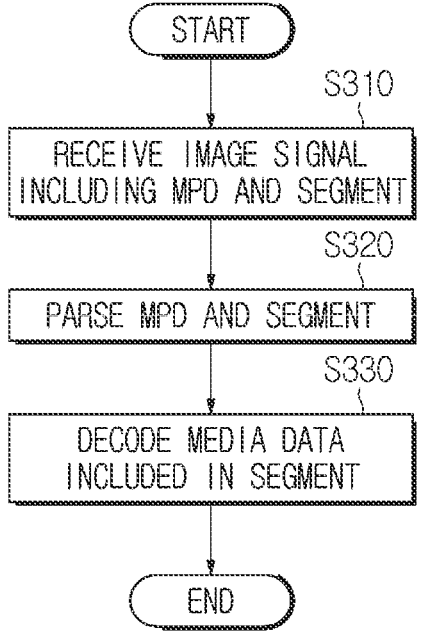
FIG. 3 is a flowchart illustrating a media file receiving method.

FIG. 3 is a flowchart illustrating a media file receiving method.

In an example, each step of FIG. 3 may be performed by the receiving apparatus B of FIG. 1. Specifically, step S310 may be performed by the receiver 55. Also, step S320 may be performed by the receive processor 60. Also, step S330 may be performed by the decoder 80.

Referring to FIG. 3, the receiving apparatus may receive an image signal from the transmitting apparatus (S310). An image signal according to the MPEG-DASH standard may include an MPD and a segment. In some embodiments, the MPD and the segment may be individually received through different image signals. For example, a first image signal including the MPD may be received from the transmitting apparatus of FIG. 1 or an external server, and a second image signal including the segment may be received from the transmitting apparatus of FIG. 1.

The receiving apparatus may extract the MPD and segment from the received image signal, and parse the extracted MPD and segment (S320). Specifically, the receiving apparatus may parse the MPD to generate a command required for obtaining a segment. Then, the receiving apparatus may obtain a segment based on the parsed MPD, and parse the obtained segment to obtain media data. In some embodiments, the receiving apparatus may perform decapsulation on media data in a file format in order to obtain the media data from the segment.

The receiving apparatus may decode the media data such as the obtained video or image (S330). The receiving apparatus may perform a series of procedures such as inverse quantization, inverse transform, and prediction in order to decode the media data. Then, the receiving apparatus may render the decoded media data and reproduce the media data through a display.

Hereinafter, an image encoding/decoding apparatus will be described in detail.

Overview of Image Encoding Apparatus

Figure 4:
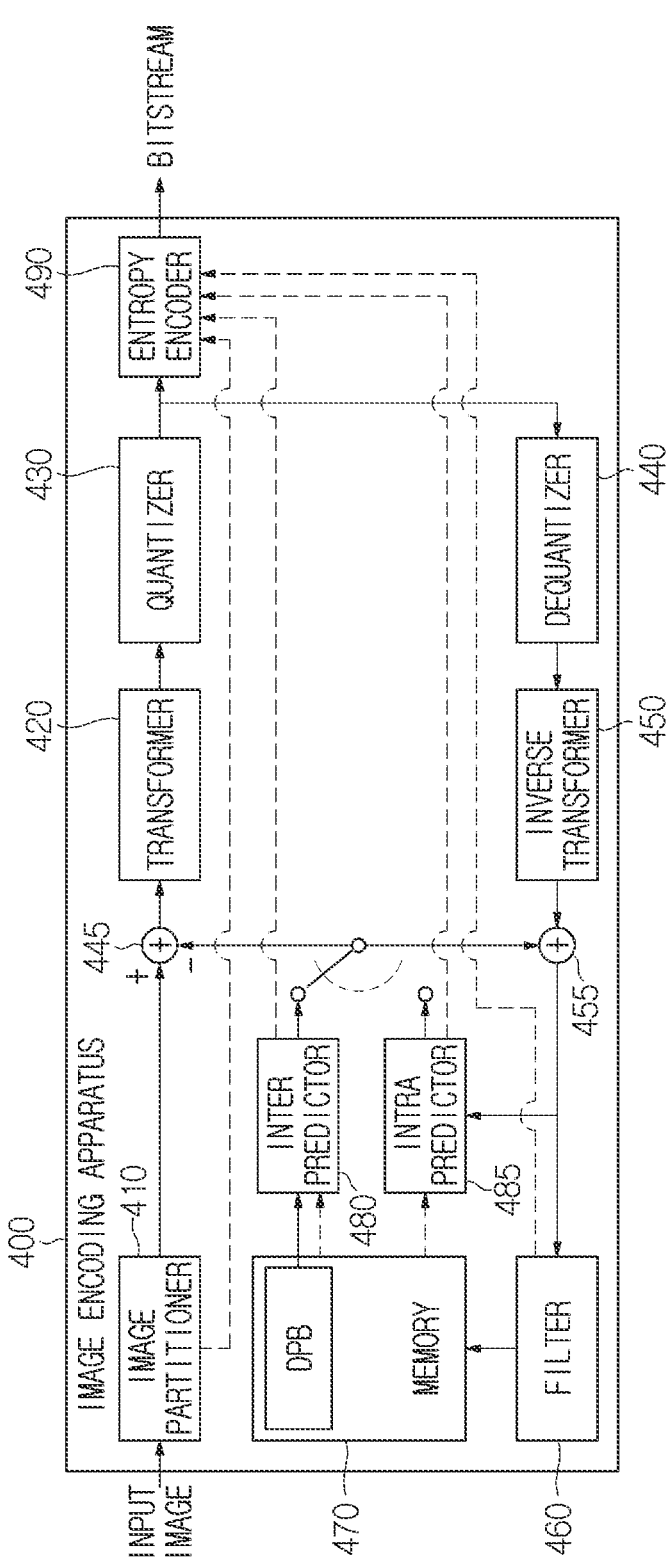
FIG. 4 is a view schematically illustrating an image encoding apparatus according to an embodiment of the present disclosure.

FIG. 4 is a view schematically illustrating an image encoding apparatus according to an embodiment of the present disclosure. The image encoding apparatus 400 of FIG. 4 may correspond to the encoder 20 of the transmitting apparatus A described with reference to FIG. 1.

Referring to FIG. 4, the image encoding apparatus 400 may include an image partitioner 410, a subtractor 415, a transformer 420, a quantizer 430, a dequantizer 440, an inverse transformer 450, an adder 455, a filter 460, a memory 470, an inter prediction unit 480, an intra prediction unit 485 and an entropy encoder 490. The inter prediction unit 480 and the intra prediction unit 485 may be collectively referred to as a "predictor". The transformer 420, the quantizer 430, the dequantizer 440 and the inverse transformer 450 may be included in a residual processor. The residual processor may further include the subtractor 415.

All or at least some of the plurality of components configuring the image encoding apparatus 400 may be configured by one hardware component (e.g., an encoder or a processor) in some embodiments. In addition, the memory 470 may include a decoded picture buffer (DPB) and may be configured by a digital storage medium.

The image partitioner 410 may partition an input image (or a picture or a frame) input to the image encoding apparatus 400 into one or more processing units. For example, the processing unit may be called a coding unit (CU). The coding unit may be obtained by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth obtained by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 480 or the intra prediction unit 485) may perform prediction on a block to be processed (current block) and generate a predicted block including prediction samples for the current block. The prediction unit may determine whether intra prediction or inter prediction is applied on a current block or CU unit. The prediction unit may generate various information related to prediction of the current block and transmit the generated information to the entropy encoder 490. The information on the prediction may be encoded in the entropy encoder 490 and output in the form of a bitstream.

The intra prediction unit 485 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 485 may determine the prediction mode applied to the current block by using a prediction mode applied tola neighboring block.

The inter prediction unit 480 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 480 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 480 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 415 may generate a residual signal (residual block or residual sample array) by subtracting the prediction signal (predicted block or prediction sample array) output from the prediction unit from the input image signal (original block or original sample array). The generated residual signal may be transmitted to the transformer 420.

The transformer 420 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than square.

The quantizer 430 may quantize the transform coefficients and transmit them to the entropy encoder 490. The entropy encoder 490 may encode the quantized signal (information on the quantized transform coefficients) and output a bitstream. The information on the quantized transform coefficients may be referred to as residual information. The quantizer 430 may rearrange quantized transform coefficients in a block type into a one-dimensional vector form based on a coefficient scanning order and generate information on the quantized transform coefficients based on the quantized transform coefficients in the one-dimensional vector form.

The entropy encoder 490 may perform various encoding methods such as, for example, exponential Golomb, context-adaptive variable length coding (CAVLC), context-adaptive binary arithmetic coding (CABAC), and the like. The entropy encoder 490 may encode information required for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 490 and/or a storage unit (not shown) storing the signal may be included as internal/external element of the image encoding apparatus 400. Alternatively, the transmitter may be provided as the component of the entropy encoder 490.

The quantized transform coefficients output from the quantizer 430 may be used to generate a residual signal. For example, the residual signal (residual block or residual samples) may be reconstructed by applying dequantization and inverse transform to the quantized transform coefficients through the dequantizer 440 and the inverse transformer 450.

The adder 455 adds the reconstructed residual signal to the prediction signal output from the inter prediction unit 480 or the intra prediction unit 485 to generate a reconstructed signal (reconstructed picture, reconstructed block, reconstructed sample array). If there is no residual for the block to be processed, such as a case where the skip mode is applied, the predicted block may be used as the reconstructed block. The adder 455 may be called a reconstructor or a reconstructed block generator. The generated reconstructed signal may be used for intra prediction of a next block to be processed in the current picture and may be used for inter prediction of a next picture through filtering as described below.

Meanwhile, in a picture encoding and/or reconstruction process, luma mapping with chroma scaling (LMCS) is applicable.

The filter 460 may improve subjective/objective image quality by applying filtering to the reconstructed signal. For example, the filter 460 may generate a modified reconstructed picture by applying various filtering methods to the reconstructed picture and store the modified reconstructed picture in the memory 470, specifically, a DPB of the memory 470. The various filtering methods may include, for example, deblocking filtering, a sample adaptive offset, an adaptive loop filter, a bilateral filter, and the like. The filter 460 may generate various information related to filtering and transmit the generated information to the entropy encoder

490 as described later in the description of each filtering method. The information related to filtering may be encoded by the entropy encoder 490 and output in the form of a bitstream.

The modified reconstructed picture transmitted to the memory 470 may be used as the reference picture in the inter prediction unit 480. When inter prediction is applied through the image encoding apparatus 400, prediction mismatch between the image encoding apparatus 400 and the image decoding apparatus may be avoided and encoding efficiency may be improved.

The DPB of the memory 470 may store the modified reconstructed picture for use as a reference picture in the inter prediction unit 480. The memory 470 may store the motion information of the block from which the motion information in the current picture is derived (or encoded) and/or the motion information of the blocks in the picture that have already been reconstructed. The stored motion information may be transmitted to the inter prediction unit 480 and used as the motion information of the spatial neighboring block or the motion information of the temporal neighboring block. The memory 470 may store reconstructed samples of reconstructed blocks in the current picture and may transfer the reconstructed samples to the intra prediction unit 485.

Overview of Image Decoding Apparatus

Figure 5:
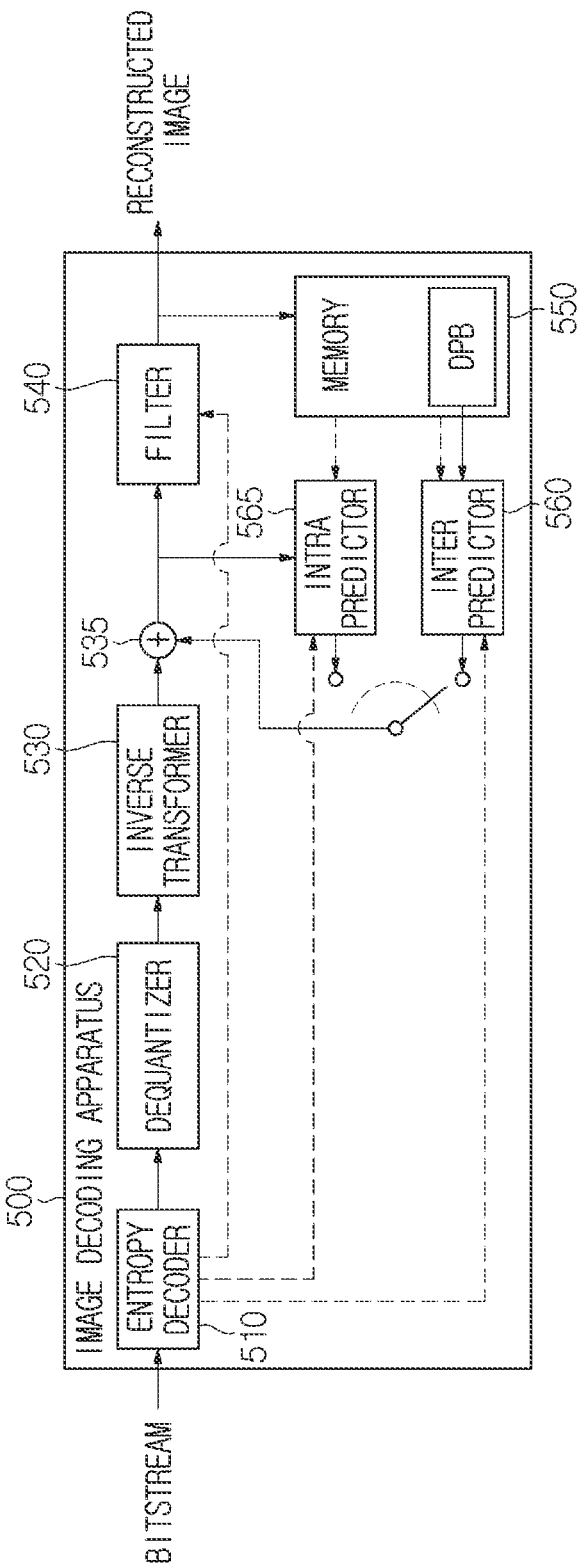
FIG. 5 is a view schematically illustrating an image decoding apparatus according to an embodiment of the present disclosure.

FIG. 5 is a view schematically illustrating an image decoding apparatus according to an embodiment of the present disclosure. The image decoding apparatus 500 of FIG. 5 may correspond to the decoder 80 of the receiving apparatus A described with reference to FIG. 1.

Referring to FIG. 5, the image decoding apparatus 500 may include an entropy decoder 510, a dequantizer 520, an inverse transformer 530, an adder 535, a filter 540, a memory 550, an inter prediction unit 560 and an intra prediction unit 565. The inter prediction unit 560 and the intra prediction unit 565 may be collectively referred to as a "predictor". The dequantizer 520 and the inverse transformer 530 may be included in a residual processor.

All or at least some of a plurality of components configuring the image decoding apparatus 500 may be configured by a hardware component (e.g., a decoder or a processor) according to an embodiment. In addition, the memory 550 may include a decoded picture buffer (DPB) or may be configured by a digital storage medium.

The image decoding apparatus 500, which has received a bitstream including video/image information, may reconstruct an image by performing a process corresponding to a process performed by the image encoding apparatus 100 of FIG. 4. For example, the image decoding apparatus 500 may perform decoding using a processing unit applied in the image encoding apparatus. Thus, the processing unit of decoding may be a coding unit, for example. The coding unit may be obtained by partitioning a coding tree unit or a largest coding unit. The reconstructed image signal decoded and output through the image decoding apparatus 500 may be reproduced through a reproducing apparatus (not shown).

The image decoding apparatus 500 may receive a signal generated by the image encoding apparatus of FIG. 4 in the form of a bitstream. The received signal may be decoded through the entropy decoder 510. For example, the entropy decoder 510 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 510 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 510 may be provided to the prediction unit (the inter prediction unit 560 and the intra prediction unit 565), and the residual value on which the entropy decoding was performed in the entropy decoder 510, that is, the quantized transform coefficients and related parameter information, may be input to the dequantizer 520. In addition, information on filtering among information decoded by the entropy decoder 510 may be provided to the filter 540. Meanwhile, a receiver (not shown) for receiving a signal output from the image encoding apparatus may be further configured as an internal/external element of the image decoding apparatus 500, or the receiver may be a component of the entropy decoder 510.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 510. The sample decoder may include at least one of the dequantizer 520, the inverse transformer 530, the adder 535, the filter 540, the memory 550, the inter prediction unit 560 or the intra prediction unit 565.

The dequantizer 520 may dequantize the quantized transform coefficients and output the transform coefficients. The dequantizer 520 may rearrange the quantized transform coefficients in the form of a two-dimensional block. In this case, the rearrangement may be performed based on the coefficient scanning order performed in the image encoding apparatus. The dequantizer 520 may perform dequantization on the quantized transform coefficients by using a quantization parameter (e.g., quantization step size information) and obtain transform coefficients.

The inverse transformer 530 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 510 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 565 may predict the current block by referring to the samples in the current picture. The description of the intra prediction unit 485 is equally applied to the intra prediction unit 565.

The inter prediction unit 560 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 560 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 535 may generate a reconstructed signal (reconstructed picture, reconstructed block, reconstructed sample array) by adding the obtained residual signal to the prediction signal (predicted block, predicted sample array) output from the prediction unit (including the inter prediction unit 560 and/or the intra prediction unit 565). If there is no residual for the block to be processed, such as when the skip mode is applied, the predicted block may be used as the reconstructed block. The description of the ladder 455 is equally applicable to the adder 535. The adder 535 may be called a reconstructor or a reconstructed block generator. The generated reconstructed signal may be used for intra prediction of a next block to be processed in the current picture and may be used for inter prediction of a next picture through filtering as described below.

Meanwhile, in a picture decoding process, luma mapping with chroma scaling (LMCS) is applicable.

The filter 540 may improve subjective/objective image quality by applying filtering to the reconstructed signal. For example, the filter 540 may generate a modified reconstructed picture by applying various filtering methods to the reconstructed picture and store the modified reconstructed picture in the memory 550, specifically, a DPB of the memory 550. The various filtering methods may include, for example, deblocking filtering, a sample adaptive offset, an adaptive loop filter, a bilateral filter, and the like.

The (modified) reconstructed picture stored in the DPB of the memory 550 may be used as a reference picture in the inter prediction unit 560. The memory 550 may store the motion information of the block from which the motion information in the current picture is derived (or decoded)

and/or the motion information of the blocks in the picture that have already been reconstructed. The stored motion information may be transmitted to the inter prediction unit 560 so as to be utilized as the motion information of the spatial neighboring block or the motion information of the temporal neighboring block. The memory 550 may store reconstructed samples of reconstructed blocks in the current picture and transfer the reconstructed samples to the intra prediction unit 565.

In the present disclosure, the embodiments described in the filter 460, the inter prediction unit 480, and the intra prediction unit 485 of the image encoding apparatus 400 may be equally or correspondingly applied to the filter 540, the inter prediction unit 560, and the intra prediction unit 565 of the image decoding apparatus 500.

The quantizer of the encoding apparatus may derive quantized transform coefficients by applying quantization to transform coefficients, and the dequantizer of the encoding apparatus or the dequantizer of the decoding apparatus ma derive transform coefficients by applying dequantization to the quantized transform coefficients. In video coding, a quantization rate may be changed and a compression rate may be adjusted using the changed quantization rate. From an implementation point of view, in consideration of complexity, a quantization parameter (QP) may be used instead of directly using the quantization rate. For example, a quantization parameter having an integer value of 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In a quantization process, a transform coefficient C may be received as input and divided by quantization rate $Q_{step}$, and a quantized transform coefficient C' may be derived based on this. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. In this case, by applying the quantization scale to the transform coefficient C, the quantized transform coefficient C' may be derived based on this.

A dequantization process is an inverse process of the quantization process, and the quantized transform coefficient C' may be multiplied by the quantization rate $Q_{step}$, thereby deriving a reconstructed transform coefficient C" based on this. In this case, a level scale may be derived according to the quantization parameter, the level scale may be applied to the quantized transform coefficient C', thereby deriving the reconstructed transform coefficient C" based on this. The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may be applied. The adaptive frequency weighting quantization technology may correspond to a method of differently applying a quantization strength according to the frequency. In adaptive frequency weighting quantization, the quantization strength may differently be applied according to the frequency using a predefined quantization scaling matrix. That is, the above-described quantization/dequantization process may be performed further based on the quantization scaling matrix.

For example, a different quantization scaling matrix may be used according to a size of a current block and/or whether a prediction mode applied to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data.

Based on the scaling list data, the quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Figure 6:
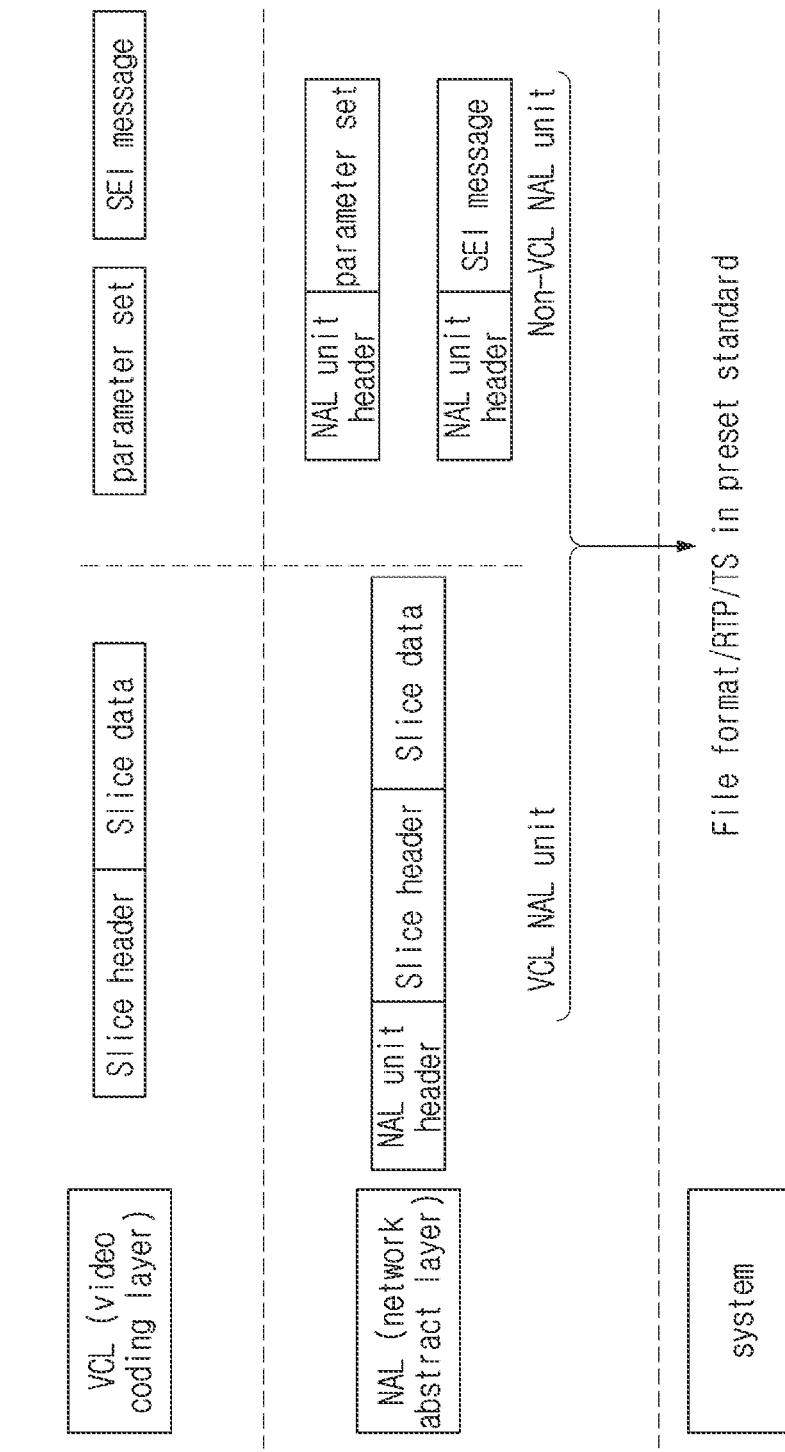
FIG. 6 is a view illustrating an example of a layer structure for a coded image/video.

FIG. 6 is a view illustrating an example of a layer structure for a coded image/video.

The coded image/video is classified into a video coding layer (VCL) for an image/video decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 6, the NAL unit may be classified into a VCL NAL unit and a non-VCL NAL unit according to the type of the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes image information (slice data). The VCL NAL unit type may be subdivided according to the property/type of the picture included in the VCL NAL unit, and the Non-VCL NAL unit type may be subdivided according to the type of a parameter set.

An example of VCL NAL unit types according to the picture type is as follows.

"IDR_W_RADL", "IDR_N_LP": VCL NAL unit type for an instantaneous decoding refresh (IDR) picture which is a type of an IRAP (Intra Random Access Point) picture;

The IDR picture may be a first picture in decoding order in a bitstream or a picture after the first picture. A picture having a NAL unit type such as "IDR_W_RADL" may have one or more Random Access Decodable Leading (RADL) pictures associated with the picture. In contrast, a picture having a NAL unit type such as "IDR_N_LP" does not have any leading picture associated with the picture.

"CRA_NUT": VCL NAL unit type for a Clean Random Access (CRA) picture which is a type of IRAP picture;

The CRA picture may be a first picture in decoding order in a bitstream or may be a picture after the first picture. The CRA picture may be associated with a RADL or RASL (Random Access Skipped Leading) picture.

"GDR_NUT": VCL NAL unit type for a random accessible Gradual Decoding Refresh (GDR) picture;

"STSA_NUT": VCL NAL unit type for a random accessible Step-wise Temporal Sublayer Access (STSA) picture;

"RADL_NUT": VCL NAL unit type for a RADL picture which is a leading picture;

"RASL_NUT": VCL NAL unit type for a RASL picture which is a leading picture;

"TRAIL_NUT": VCL NAL unit type for a trailing picture;

A trailing picture is a non-IRAP picture, which may follow the IRAP picture or GDR picture associated with the trailing picture in output order, and may follow the IRAP picture associated with the trailing picture in decoding order.

Next, an example of non-VCL NAL unit types according to the parameter set type is as follows.

"DCI_NUT": non-VCL NAL unit type including decoding capability information (DCI)

"VPS_NUT": non-VCL NAL unit type including a video parameter set (VPS)

"SPS_NUT": non-VCL NAL unit type including a sequence parameter set (SPS)

"PPS_NUT": non-VCL NAL unit type including a picture parameter set (PPS)

"PREFIX_APS_NUT", "SUFFIX_APS_NUT": non-VCL NAL unit type including an adaptation parameter set (APS)

"PH_NUT": non-VCL NAL unit type including a picture header

The above-described NAL unit types may be identified by predetermined syntax information (e.g., nal_unit_type) included in the NAL unit header.

Meanwhile, in the present disclosure, the image/video information encoded in the form of a bitstream may not only include picture partitioning information, intra/inter prediction information, residual information and/or in-loop filtering information, etc. but also include slice header information, picture header information, APS information, PPS information, SPS information, VPS information, and/or DCI. In addition, the encoded image/video information may further include general constraint information (GCI) and/or NAL unit header information. According to embodiments of the present disclosure, the encoded image/video information may be encapsulated into a media file of a predetermined format (e.g., ISO BMFF) and transmitted to a receiving apparatus.

Media File

The encoded image information may be configured (or formatted) based on a predetermined media file format to generate a media file. For example, the encoded image information may form a media file (segment) based on one or more NAL units/sample entries for the encoded image information.

A media file may include sample entry(s) and track(s). In one example, a media file may include various records, and each record may include information related to a media file format or information related to an image. In one example, one or more NAL units may be stored in a configuration record (or decoder configuration record) field in the media file. Additionally, the media file may contain an operating point record and/or an operating point group box. In this disclosure, a decoder configuration record supporting Versatile Video Coding (VVC) may be referred to as a VVC decoder configuration record. Likewise, an operating point record supporting VVC may be referred to as a VVC operating point record.

The term "sample" used in the media file format may mean all data associated with a single time or single element of any one of three sample arrays (Y, Cb, Cr) representing a picture. When the term "sample" is used in the context of a track (in a media file format), "sample" may refer to all data associated with a single time of the track. Here, the time may correspond to a decoding time or a composition time. Also, when the term "sample" is used in the context of a picture (e.g., luma sample), "sample" may indicate a single element of any one of three sample arrays representing the picture.

Figure 7:
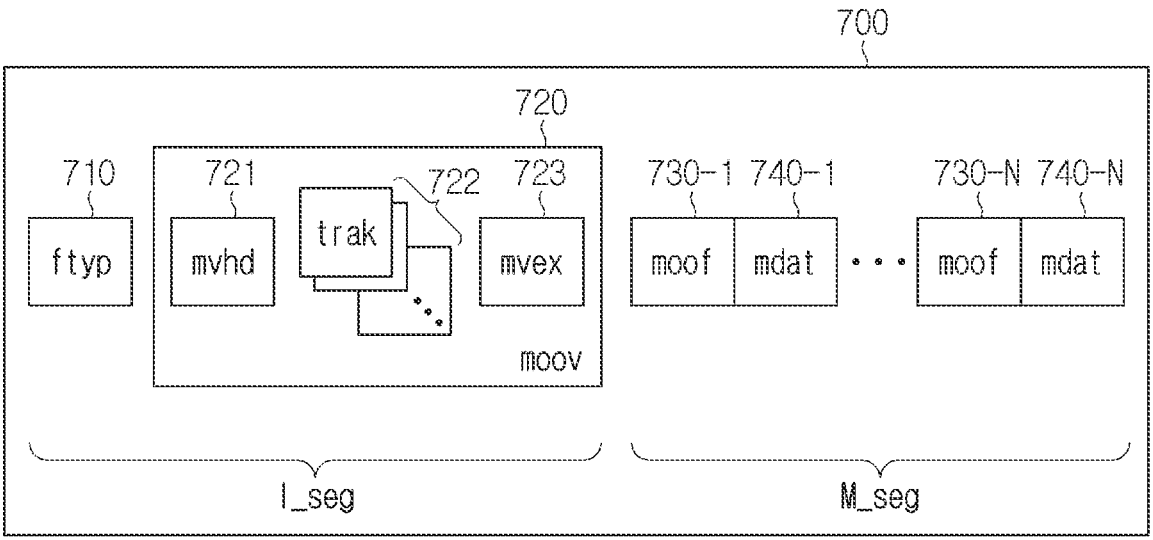
FIG. 7 is a view illustrating an example of a media file structure.

FIG. 7 is a view illustrating an example of a media file structure,

As described above, in order to store and transmit media data such as audio, video, or image, a standardized media file format may be defined. In some embodiments, the media file may have a file format according to the ISO base media file format (ISO BMFF).

A media file may include one or more boxes. Here, the box may be a data block or object including media data or metadata related to the media data. Within a media file, boxes may form a hierarchical structure. Accordingly, the media file may have a form suitable for storage and/or transmission of large-capacity media data. Also, the media file may have a structure that facilitates access to specific media data.

Referring to FIG. 7, the media file 700 may include an ftyp box 710, a moov box 720, a moof box 730, and an mdat box 740.

The ftyp box 710 may include a file type, file version, and/or compatibility related information of the media file 700. In some embodiments, the ftyp box 710 may be located at the beginning of the media file 700.

The moov box 720 may include metadata describing the media data in the media file 700. In some embodiments, the moov box 720 may be present in an uppermost layer among metadata-related boxes. Also, the moov box 720 may include header information of the media file 700. For example, the moov box 720 may include a decoder configuration record as decoder configuration information.

The moov box 720 is a sub-box, and may include an mvhd box 721, a trak box 722 and an mvex box 723.

The mvhd box 721 may include presentation-related information (e.g., media creation time, change time, period, etc.) of media data in the media file 700.

The trak box 722 may include metadata for a track of media data. For example, the trak box 722 may contain stream-related information, presentation-related information, and/or access-related information for an audio track or a video track. A plurality of trak boxes 722 may be present according to the number of tracks present in the media file 700. An example of the structure of the trak box 722 will be described later with reference to FIG. 8.

The mvex box 723 may include information on whether one or more movie fragments is present in the media file 700. The movie fragment may be a part of media data obtained by dividing media data in the media file 700. The movie fragment may include one or more coded pictures. For example, the movie fragment may include one or more picture groups (GOPs), and each picture group may include a plurality of coded frames or pictures. The movie fragment may be stored in each of the mdat boxes 740-1 to 740-N (where N is an integer greater than or equal to 1).

The moof boxes 730-1 to 730-N (where N is an integer greater than or equal to 1) may include metadata for movie fragments, that is, mdat boxes 740-1 to 740-N. In some embodiments, the moof boxes 730-1 to 730-N may be present in an uppermost layer among metadata-related boxes of the movie fragment.

The mdat boxes 740-1 to 740-N may include actual media data. A plurality of mdat boxes 740-1 to 740-N may be present according to the number of movie fragments present in the media file 700. Each of the mdat box 740-1 to 740-N may include one or more audio samples or video samples. In one example, a sample may mean an access unit (AU). When the decoder configuration record is stored in the sample entry, the decoder configuration record may include a size of a length field for indicating the length of a Network Abstraction Layer (NAL) unit to which each sample belongs as well as a parameter set.

In some embodiments, the media file 700 may be processed and stored and/or transmitted in units of segments. The segment may include an initialization segment I_seg and a media segment M_seg.

The initialization segment I_seg may be an object type data unit including initialization information for accessing a representation. The initialization segment I seg may include the aforementioned ftyp box 710 and/or moov box 720.

The media segment M_seg may be an object type data unit including temporally divided media data for a streaming service. The media segment M_seg may include the aforementioned moof boxes 730-1 to 730-N and mdat boxes 740-1 to 740-N. Although not shown in FIG. 7, the media segment M_seg may further include a styp box including segment type related information and a sidx box including identification information of subsegments included in the media file 700 (optional).

Figure 8:
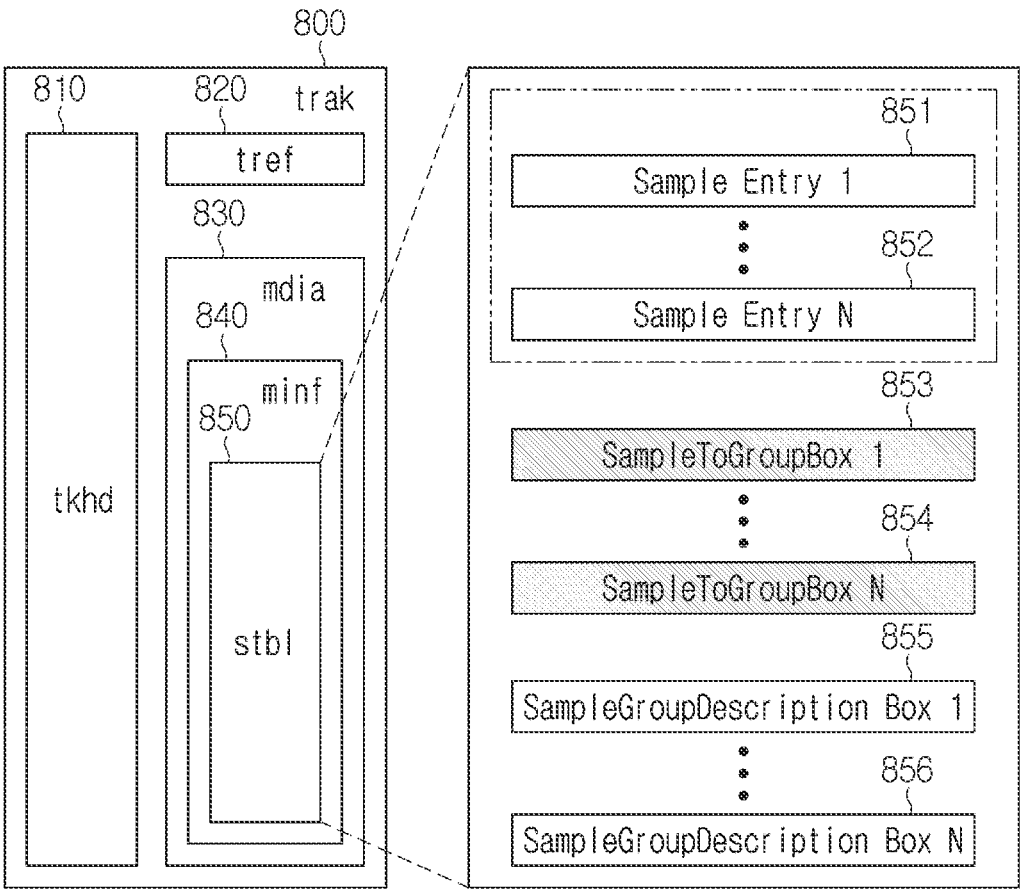
FIG. 8 is a view illustrating an example of a trak box structure of FIG. 7.

FIG. 8 is a view illustrating an example of a trak box structure of FIG. 7.

Referring to FIG. 8, the trak box 800 may include a tkhd box 810, a tref box 820 and a mdia box 830.

The tkhd box 810 is a track header box, and may include header information of a track (hereinafter, referred to as a 'corresponding track') indicated by the trak box 800, for example, a creation/modification time of the corresponding track, a track identifier and the like.

The tref box 820 is a track reference box, and may include reference information of the corresponding track, for example, a track identifier of another track referenced by the corresponding track.

The mdia box 830 may include information and objects describing media data in the corresponding track. In some embodiments, the mdia box 830 may include a minf box 840 that provides information on the media data. Also, the minf box 840 may include an stbl box 850 including metadata for samples including the media data.

The stbl box 850 is a sample table box, and may include position information, time information, and the like of samples in a track. A reader may determine a sample type, a sample size within a container and an offset based on the information provided by the stbl box 850, and locate samples in the correct time order.

The stbl box 850 may include one or more sample entry boxes 851 and 852. Sample entry boxes 851 and 852 may provide various parameters for a particular sample. For example, a sample entry box for a video sample may include the width, height, resolution and/or frame count of the video sample. In addition, a sample entry box for an audio sample may include a channel count, a channel layout and/or a sampling rate of the audio sample. In some embodiments, the sample entry boxes 851 and 852 may be included in a sample description box (not shown) in the stbl box 850. The sample description box may provide detailed information on a coding type applied to a sample and any initialization information required for the coding type.

In addition, the stbl box 850 may include one or more sample-to-group boxes 853 and 854 and one or more sample group description boxes 855 and 856.

The sample-to-group boxes 853 and 854 may indicate a sample group to which a sample belongs. For example, the sample-to-group boxes 853 and 854 may include a grouping type syntax element (e.g., grouping_type) indicating the type of the sample group. Also, the sample-to-group boxes 853 and 854 may contain one or more sample group entries. The sample group entry may include a sample count syntax element (e.g., sample_count) and a group description index syntax element (e.g., group_description_index). Here, the sample count syntax element may indicate the number of contiguous samples to which the corresponding group description index is applied. The sample group may include a stream access point (SAP) sample group, a random access recovery point sample group, and the like, and details thereof will be described later.

The sample group description boxes 855 and 856 may provide a description of a sample group. For example, the sample group description boxes 855 and 856 may include a grouping type syntax element (e.g., grouping_type). The sample group description boxes 855 and 856 may correspond to the sample-to-group boxes 853 and 854 having the same grouping type syntax element value. Also, the sample group description boxes 855 and 856 may include one or more sample group description entries. The sample group description entries may include a 'spor' sample group description entry, a 'minp' sample group description entry, a 'roll' sample group description entry, and the like.

As described above with reference to FIGS. 7 and 8, media data may be encapsulated into a media file according to a file format such as ISO BMFF. In addition, the media file may be transmitted to the receiving apparatus through an image signal according to the MMT standard or the MPEG-DASH standard.

Figures 9, 10:
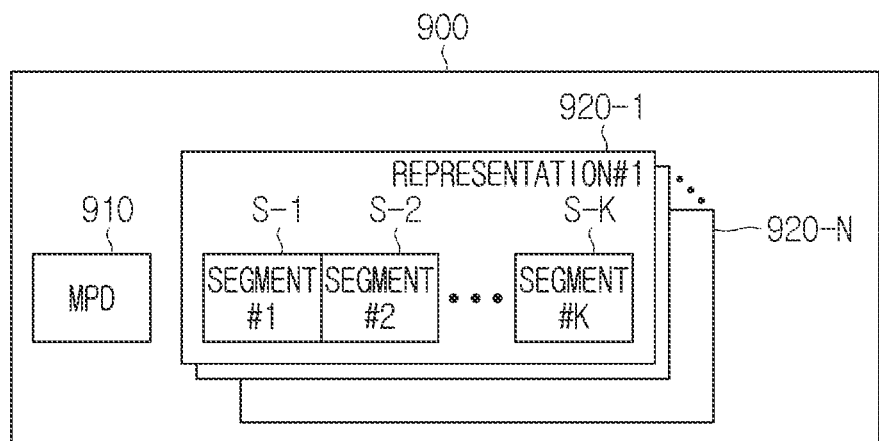
FIG. 9 is a view illustrating an example of an image signal structure.
FIG. 10 is a view illustrating a syntax structure of an EOS sample group entry.

FIG. 9 is a view illustrating an example of an image signal structure.

Referring to FIG. 9, an image signal conforms to the MPEG-DASH standard and may include an MPD 910 and a plurality of representations 920-1 to 920-N.

The MPD 910 is a file including detailed information on media presentation, and may be expressed in an XML format. The MPD 910 may include information on a plurality of representations 920-1 to 920-N (e.g., bit rate of streaming content, image resolution, frame rate, etc.) and information on URLs of HTTP resources (e.g., initialization segment and media segments).

Each of the representations 920-1 to 920-N (where N is an integer greater than 1) may be divided into a plurality of segments S-1 to S-K (where K is an integer greater than 1). Here, the plurality of segments S-1 to S-K may correspond to the initialization segment and media . . . segments described above with reference to FIG. 7. The K-th segment S-K may represent the last movie fragment in each of the representations 920-1 to 920-N. In some embodiments, the number (that is, the value of K) of segments S-1 to S-K included in each of the representations 920-1 to 920-N may be different from each other.

Each of the segments S-1 to S-K may include actual media data, such as one or more video or image samples. The characteristics of the video or image samples contained within each of the segments S-1 to S-K may be described by the MPD 910.

Each of the segments S-1 to S-K has a unique URL (Uniform Resource Locator) and thus may be accessed and reconstructed independently.

Meanwhile, three types of elementary streams may be defined as follows to store VVC content.

Video elementary stream: The video elementary stream includes VCL NAL units, but does not include parameter sets, DCI or OPI NAL units. At this time, parameter sets, DCI or OPI NAL units may be stored in one or more sample entries. The video elementary stream may include non-VCL NAL units excluding parameter sets, DCI NAL units, and OPI NAL units.

Video and parameter set elementary stream: The video and parameter set elementary stream includes VCL NAL units. Also, the video and parameter set elementary stream may include parameter sets, DCI or OPI NAL units, and may have parameter sets, DCI or OPI NAL units stored in one or more sample entries.

Non-VCL elementary stream: A non-VCL elementary stream includes only non-VCL NAL units that are synchronized with the elementary stream carried within the video track.

In addition, the VVC file format defines various types of tracks as follows.

VVC track: A VVC track may indicate the VVC bitstream, by including NAL units in samples and sample entries, possibly by referencing VVC tracks containing other sublayers of the VVC bitstream, and possibly by referencing VVC subpicture tracks. When a VVC track references VVC subpicture tracks, the VVC track may be referred to as a VVC base track.

VVC non-VCL track: Adaptive Parameter Sets (APSs) carrying Adaptive Loop Filter (ALF), Luma Mapping with Chroma Scaling (LMCS) or scaling list parameters and other non-VCL NAL units may be stored in a track that is separate from the track containing the VCL NAL units and transmitted through the track. The VVC non-VCL track may refer to the track. The VVC non-VCL track does not include parameter sets, DCI or OPI NAL units in sample entries.

VVC subpicture track: A VVC subpicture track may contain a sequence of one or more VVC subpictures or a sequence of one or more complete slices forming a rectangular area. In addition, a sample of a VVC subpicture track may contain one or more complete subpictures that are contiguous in decoding order or one or more complete slices that are contiguous in decoding order and form a rectangular area. VVC subpictures or slices included in each sample of a VVC subpicture track may be contiguous in decoding order.

On the other hand, VVC non-VCL tracks and VVC subpicture tracks may enable optimal delivery of VVC video in streaming applications. Each of the tracks may be carried in its own DASH representations. In addition, for decoding and rendering of a subset of tracks, a DASH representation containing a subset of VVC subpicture tracks and a DASH representation containing non-VCL tracks may be requested by the client, segment by segment. In this way, it is possible to avoid redundant transmission of APS and other non-VCL NAL units.

Data Sharing and Reconstruction VVC Bitstream

The output of this process is a VVC bitstream, which is referred to as the output bitstream.

A file reader shall invoke this process when one or more of the following conditions are true.

i) A VVC bitstream (e.g., 'vvcb') entity group is present in a file and the file reader processes the VVC bitstream represented by the entity group to generate the output bitstream.

ii) An operating point (e.g., 'opeg') entity group is present in a file and the file reader uses any of the operating points described by the entity group to generate the output bitstream.

iii) The file reader extracts a subset of the layers or sublayers of a VVC track with ptl_present_flag equal to 1 to generate the output bitstream.

iv) The file reader processes a VVC base track.

v) The file reader processes a VVC track that has an associated VVC non-VCL track.

This process consists of the following ordered steps.

(Step 1):

When any one of conditions to i) to iii) above is true, an operating point is determined at the start of the VVC bitstream and may be determined again for any IRAP or GDR access unit.

1) The method of determining the operating point is outside the scope of the standard document, e.g., ISO/IEC 14496-15.

2) When the file reader either selects an operating point the first time or selects a different operating point than what was selected earlier, the file reader shall indicate the output layer set index and the highest TemporalId value of the selected operating point to the VVC decoder either by including them in an OPI NAL unit inserted into the output bitstream (as the first NAL unit following the AU delimiter NAL unit, if any, in the first access unit where the operating point is taken into use) or by other means.

In an example, it is possible to down-switch and up-switch layers and sublayers at access units (AUs) that do not start a CVS as long as the set of layers and sublayers being decoded is within the latest operating point that was indicated to the decoder through an OPI NAL unit or by other means. Layer up-switching can take place at an IRAP, GDR, or STSA picture unit with TemporalId equal to 0. Sublayer up-switching can take place at an STSA picture unit.

3) The subsequent ordered steps apply to the sequence of access units in decoding order starting from an access unit wherein the operating point is determined, inclusive, to the end of the bitstream or the access unit wherein the operating point is determined next time, exclusive, whichever is earlier in decoding order.

(Step 2):

When a VVC bitstream is represented by multiple VVC tracks, a file parser may identify the tracks needed for the chosen operating point as follows.

i) When an operating point from the 'opeg' entity group contains the selected operating point, select the tracks that belong to the operating point as indicated by the 'opeg' entity group.

ii) When an 'opeg' entity group is not present (i.e., when a 'vopi' sample group is present), determine, from the 'vvcb' entity group which VVC tracks represent a VVC bitstream. The first entity_id of the 'vvcb' entity group identifies the track containing the 'vopi' sample group. The mapping of operating points to layers and sublayers is concluded from the 'vopi' sample group. The set of tracks containing the layers and sublayers of the selected operating point and hence needed for decoding the selected operating point are concluded from the 'linf' sample groups present in the VVC tracks of the VVC bitstream.

Since a particular layer or sublayer may be represented by more than one track, when figuring out the required tracks for an operating point, a selection may need to be made among the set of tracks that all carry the particular layer or sublayer.

(Step 3):

Access units to the output bitstream may be reconstructed in the decoding time order of samples among the VVC tracks needed for the chosen operating point (when condition i, ii, or iii above is true), or within the VVC base track (when condition iv above is true), or within the VVC track (when condition v above is true).

4) If several tracks contain data for the access unit, the alignment of respective samples in tracks may be performed based on the sample decoding times.

5) A sequence of access units may be reconstructed from the respective samples in the required tracks by invoking the implicit reconstruction process.

6) The reconstructed access units may be placed into the output bitstream in increasing order of decoding time.

(Step 4):

When both of the following conditions are true, the file reader shall include an EOS NAL unit in each layer of the applied operating point into the output bitstream.

the sequence of access units is followed by a selection a different operating point than what was selected earlier, and the sequence of access units does not end with EOS NAL units in each layer of the applied operating point or an EOB NAL unit When a VVC bitstream is represented by multiple VVC tracks, the decoding times of the samples shall be such that if the tracks were combined into a single bitstream ordered by increasing decoding time, the access unit order would be correct as specified in the standard document, e.g., ISO/IEC 23090-3 (VVC standard).

Implicit Reconstruction of a VVC Bitstream

This process may specify the reconstruction of an access unit from the time-aligned samples having the current decoding time among the required VVC track(s), the associated VVC non-VCL tracks, if any, and the referenced VVC subpicture tracks, if any.

When reconstructing a bitstream containing a sublayer for which the VCL NAL units have TemporalId greater than 0, all lower sublayers (i.e., those for which the VCL NAL units have smaller TemporalId) within the same layer are also included in the resulting bitstream.

When the sample(s) with the current decoding time contain VCL NAL units with TemporalId greater than the greatest TemporalId included in the selected operating point, no access unit is reconstructed from the current decoding time.

When reconstructing an access unit, picture units (as specified in the standard document, e.g., ISO/IEC 23090-3 (VVC standard)) from samples having the same decoding time are placed into the access unit in increasing order of the nuh_layer_id value. The following steps may be performed when the condition applies.

When a sample of the track containing the first picture unit of a sample is marked as belonging to a sample group 'aud' with ols_idx and lower_ols_idx_inclusive corresponding to the target operating point, the AUD NAL unit within the 'aud' sample group may be placed into the AU as the first NAL unit of the AU.

When a sample in a track is marked as belonging to a sample group 'eos' with ols_idx, max_tid and lower_ols_idx_inclusive, corresponding to the target operating point, the EOS NAL unit within the 'eos' sample group may be placed into the AU at the indicated position, i.e. after the eos_position-th NAL unit of the reconstructed AU excluding the AUD NAL unit if inserted by a sample group 'aud'.

When a sample in a track is marked as belonging to a sample group 'eob' with ols_idx, max_tid, and lower_ols_idx_inclusive, corresponding to the target operating point the EOB NAL unit within the 'eob' sample group is placed into the AU after all NAL units of the AU (including the EOS NAL unit).

Only the picture units from the layers and sublayers that are in the target operating point are included in the output bitstream.

In an example, when the Operating Points Entity Group is not present, there could be layers or sublayers that are carried in the tracks required for bitstream reconstruction but do not belong to the target operating point.

In an example, VVC decoder implementations take as input a bitstream corresponding to the target output layer set index and the highest TemporalId value of the target operating point, which respectively correspond to the TargetOlsIdx and HighestTid variables of the standard document, e.g., ISO/IEC 23090-3 (VVC standard): 2021. A file parser needs to ensure that the reconstructed bitstream does not contain any other layers and sublayers than those included in the target operating point before sending it to a VVC decoder.

When reconstructing an access unit based on an operating point associated with output layer set index i (in the for loop over num_olss in the 'vopi' sample group), the following applies:

When reconstructing an access unit, for each layer in the output layer set with index j in the range from 0 to layer_count[i]−1, inclusive, if num_ref_sublayers_in_layer_in_ols[i][j] is greater than 0, then the VCL NAL units may belong to the sublayers of that layer for which the VCL NAL have units TemporalId less than or equal to Min(num_ref_sublayers_in_layer_in_ols[i][j]−1, max_temporal_id) are included in the resulting bitstream and the required tracks are selected accordingly. Here, max_temporal_id may mean the value of the corresponding syntax element for the operating point.

When reconstructing an access unit, for each layer in the output layer set with index j in the range from 0 to layer_count[i]−1, inclusive, if num_ref_sublayers_in_layer_in_ols[i][j] is equal to 0, from all the picture units of the reference layers only IRAP picture units and GDR picture units with ph_recovery_poc_cnt equal to 0 may be included in the resulting bitstream and the required tracks may be selected accordingly.

If an access unit of a VVC track contains unspecified NAL unit types (NAL units that have nal_unit_type in the range of UNSPEC_28 . . . . UNSPEC_31, inclusive, i.e., nal_unit_type values in the range of 28 to 31, inclusive, as defined in the standard document, e.g., ISO/IEC 23090-3 (VVC standard)), then the unspecified NAL unit types shall be discarded from the final reconstructed bitstream.

When a VVC track contains a 'subp' track reference, each picture unit may be reconstructed as specified in subclause 11.6.3 of the standard document, e.g., ISO/IEC 14496-15. When a VVC track contains a 'recr' track reference, each picture unit may be reconstructed as specified in subclause 11.6.6 of the standard document, e.g., ISO/IEC 14496-15. The process in the above subclauses may be repeated for each layer of the target operating point in increasing nuh_layer_id order.

The reconstructed access units may be placed into the VVC bitstream in increasing order of decoding time.

Since a particular layer or sublayer may be represented by more than one track, when figuring out the required tracks for an operating point, a selection may need to be made among the set of tracks that all carry the particular layer or sublayer.

Reconstructing a Picture Unit from a Sample in a VVC Track Referencing VVC Subpicture Tracks A sample of a VVC track may be resolved to a picture unit in the order of the bullets:

The AUD NAL unit, when present in the sample or in the time-aligned sample of the associated VVC non-VCL track, may be included in the picture unit.

In an example, when an AUD NAL unit is present in a sample, the AUD NAL unit may be the first NAL unit in the sample.

When there is an associated VVC non-VCL track and the picture unit is the first picture unit in this access unit that is reconstructed from the sample, the following NAL units may be included in the picture unit:

If there is at least one NAL unit in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units (excluding the AUD NAL unit, if any) in the time-aligned sample of the associated VVC non-VCL track up to and excluding the first of these NAL units. Otherwise, all NAL units in the time-aligned sample of the associated VVC non-VCL track.

If there is at least one NAL unit in the sample with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units in the sample up to and excluding the first of these NAL units may be included in the picture unit, otherwise all NAL units in the sample in the picture unit.

If the reader has selected an operating point, the reader shall exclude any OPI NAL units stored in sample entries and samples from the reconstructed access unit in all of the steps above.

In an example, it is discouraged to include OPI NAL units in sample entries or samples when multiple tracks are used to store layers or sublayers of a VVC bitstream.

If the VVC track does not reference VVC subpicture tracks, the NAL units of the sample from the VVC track may be included in the picture unit.

Otherwise, the following may apply:

The track references may be resolved as specified in subclause 11.6.4 of the standard document, e.g., ISO/IEC 14496-15.

If necessary, parameter sets may be updated when necessary as specified in subclause 11.6.5 of the standard document, e.g., ISO/IEC 14496-15.

The picture unit is appended by the content of the time-aligned (in decoding time) resolved sample from each referenced VVC subpicture track in the order of the VVC subpicture tracks being referenced in the 'subp' track reference (when num_subpic_ref_idx in the same group entry of the 'spor' sample group entry mapped to this sample is equal to 0) or in the order as specified in the 'spor' sample group description entry mapped to this sample (when num_subpic_ref_idx in the same group entry of the 'spor' sample group entry mapped to this sample is greater than 0), excluding all DCI, OPI, VPS, SPS, PPS, AUD, PH, EOS, EOB NAL units as well as all SEI NAL units that contain a scalable nesting SEI message with sn_subpic_flag equal to 1.

When a referenced VVC subpicture track is associated with a VVC non-VCL track, the resolved sample of the VVC subpicture track may contain the following NAL units: i) If there is at least one NAL unit in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units (excluding the AUD NAL unit, if any) in the time-aligned sample of the associated VVC non-VCL track up to and excluding the first of these NAL units. ii) Otherwise all NAL units in the time-aligned sample of the associated VVC non-VCL track. iii) The NAL units from the sample of the referenced VVC subpicture track. iv) The remaining NAL units, if any, from the time-aligned sample of the associated VVC non-VCL track.

All NAL units in the sample with nal_unit_type equal to EOS_NUT, EOB_NUT, SUFFIX_APS_NUT, SUFFIX_SEI_NUT, FD_NUT, or RSV_NVCL_27 may be included in the picture unit.

When there is an associated VVC non-VCL track and the picture unit is the last picture unit in this access unit that is reconstructed from the sample, all NAL units in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27 may be included in the picture unit.

All NAL units or NAL unit like structures in the sample with nal_unit_type in the range of UNSPEC_28 . . . . UNSPEC_31, inclusive, shall be discarded.

Hereinafter, an EOS sample group and an EOB sample group will be described in detail.

End of Sequence Sample Group—Problems of Related Art

A sample group description entry of an end of sequence (EOS) sample group may contain an EOS NAL unit. When a sample is mapped to an end of sequence sample group ('eos'), it indicates that the EOS NAL unit contained within the sample group needs to be inserted at the indicated position in the reconstructed AU if the target operating point corresponds to any of the output layer sets and maximum temporal ID indicated within the EOS sample group. Meanwhile, the EOS sample group may also be referred to as the 'eos' sample group or 'eos', and these will be used interchangeably hereinafter, unless otherwise specified.

FIG. 10 is a view illustrating a syntax structure of an EOS sample group entry.

Figures 11, 12:
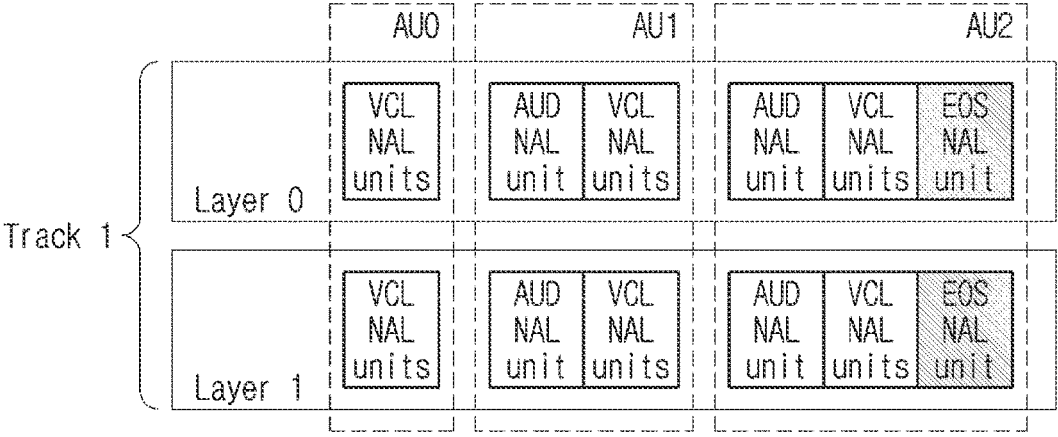
FIG. 11 is a view illustrating an example of a track carrying multiple layers.
FIG. 12 is a view illustrating a syntax structure of an EOS sample group entry according to an embodiment of the present disclosure.

FIG. 11 is a view illustrating an example of a track carrying multiple layers.

First, referring to FIG. 10, the EOS sample entry EndOfSequenceSampleEntry may include syntax elements ols_idx, max_tid, lower_ols_idx_inclusive, eos_position, and eosNalUnit.

The syntax elements ols_idx and max_tid may indicate the operating point, to which the EOS sample group applies.

The syntax element lower_ols_idx_inclusive may indicate whether the EOS sample group applies to only a specific operating point. For example, lower_ols_idx_inclusive equal to a second value (e.g., 0) indicates that the EOS sample group applies only to the operating point with OLS index equal to ols_idx. lower_ols_idx_inclusive equal to a first value (e.g., 1) indicates that the EOS sample group applies to any OLS with index from 0 to ols_idx, inclusive.

The syntax element eos_position may indicate the index of the NAL unit of the reconstructed access unit after which the EOS NAL unit is placed in the reconstructed bitstream.

The syntax element eosNalUnit may contain an EOS NAL unit as specified in the standard document, e.g., ISO/IEC 23090-3 (VVC standard).

If the VVC elementary stream includes multiple layers, the track may carry multiple layers. In this case, multiple EOS NAL units, one for each layer, need to be inserted into the access unit. For example, as shown in FIG. 11, in track 1 of the multi-layer structure, a video sequence may be created for each layer. As a result, to indicate the end of the video sequence, a total of two EOS NAL units, one for each layer (Layer 0 and Layer 1), shall be inserted into AU2, which is the last access unit.

However, according to the syntax structure of FIG. 10, one 'eos' sample group currently is capable to carry only one EOS NAL unit. Considering that only one 'eos' sample group is mapped to each sample or access unit, this means that only one EOS NAL unit can be inserted into each sample or access unit. Therefore, a problem arises in which the 'eos' sample group design of FIG. 10 cannot work for a VVC elementary stream with multiple layers.

To solve this problem, embodiments of the present disclosure provide a new 'eos' sample group design capable of carrying a plurality of EOS NAL units.

Embodiments of the present disclosure may include at least one of the following configurations. Depending on the embodiment, the above items may be implemented individually or in combination of two or more.

(Item 1): Allow an 'eos' sample group to carry multiple EOS NAL units.

(Item 2): To support item 1 above, the following changes to the syntax of the 'eos' sample group are made:

Signal a new syntax element called num_eos_nal_unit_minus1 to specify the number of EOS NAL units that are present in the 'eos' sample group. The number of EOS NAL units in the 'eos' sample group may be num_eos_nal_unit_minus1 plus one.

Have a loop of EOS NAL unit and its position for insertion.

(Item 3): For signalling of the position for insertion of EOS NAL unit (i.e., eos_position[i], the position for insertion only consider the NAL units that are in the sample, not counting any NAL units that may be inserted.

(Item 4): The syntax element eos_position[i] for the position for insertion of the EOS NAL unit may be signaled. Here, the syntax element eos_position[i] may specify the index of the NAL unit in the sample after which the i-th EOS NAL unit will be inserted.

(Item 5): Instead of signalling eos position[i], signal delta_eos_position[i]. In this case, the value of eos_position [i] may be derived based on delta_eos_position[i] as follows.

If i is equal to 0, eos_position[i] may be derived to be equal to delta_eos_position[i].

Otherwise, eos_position[i] may be derived to be equal to eos_position[i−1]+delta_eos_position[i].

(Item 6): Unlike Item 3, there is no need to signal the position information about where the EOS NAL unit should be placed. When the sample mapped to the 'eos' sample group is included for the reconstruction of the AU, the EOS NAL units in the sample group may be inserted at the end of reconstructed AU.

(Item 7): In another alternative to 3, there is no need to signal the position information about where the EOS NAL unit should be placed. When the sample mapped to the 'eos' sample group is included for the reconstruction of the AU, the EOS NAL units in the sample group may be inserted into the reconstructed AU after all NAL units from the sample that are needed for the AU.

Hereinafter, embodiments of the present disclosure based on the above items will be described in detail.

Embodiment 1

Embodiment 1 of the present disclosure may be provided based on Items 1 to Item 4 described above. Implementation of Embodiment 1 may be relative to the VVC file format specification.

According to Embodiment 1, unlike an existing EOS sample group, a plurality of EOS NAL units may be carried in one EOS sample group. Hereinafter, a repeated description of the existing EOS sample group described with reference to FIG. 10 will be omitted.

FIG. 12 is a view illustrating a syntax structure of an EOS sample group entry according to an embodiment of the present disclosure.

Referring to FIG. 12, an EOS sample group entry End-OfSequenceSampleEntry may include syntax elements ols_idx, max_tid, lower_ols_idx_inclusive, num_eos_nal_unit_minus1, eos_position[i], and eosNalUnit[i].

The syntax elements ols_idx and max_tid may indicate the operating point, to which the EOS sample group applies.

The syntax element lower_ols_idx_inclusive may indicate whether the EOS sample group applies to only a specific operating point. For example, lower_ols_idx_inclusive equal to a second value (e.g., 0) may indicate that the EOS sample group applies only to the operating point with output layer set (OLS) index equal to ols_idx. lower_ols_idx_inclusive equal to a first value (e.g., 1) may indicate that the EOS sample group applies to any OLS with index from 0 to ols_idx, inclusive.

The syntax element num_eos_nal_unit_minus1 may indicate a value obtained by subtracting 1 from the number of EOS NAL units present in the EOS sample group.

The syntax element eos_position[i] may indicate the index of the NAL unit within the current sample after which the i-th EOS NAL unit is placed. The index of the NAL unit may take into account only NAL unit that natively present in the current sample, excluding any other NAL unit(s) that may be inserted/placed in the current sample. Note that the first NAL unit in the current sample may be considered the 0-th NAL unit.

In an example, the current sample may also be mapped to 'aud' sample group and/or 'eob' sample group which cause AUD NAL unit and/or EOB NAL unit to be inserted into the sample or the reconstructed access unit. In this case, the eos_position[i] may be based on the position of NAL unit prior to the insertion of AUD and/or EOB NAL units.

The syntax element eosNalUnit[i] may contain the i-th EOS NAL unit as specified in the standard document, e.g., ISO/IEC 23090-3 (VVC standard), in the sample group.

Meanwhile, some of implicit reconstruction processes of the above-described VVC bitstream may be modified as follows according to Embodiment 1.

When reconstructing an access unit, picture units (as specified in the standard document, e.g., ISO/IEC 23090-3) from samples having the same decoding time are placed into the access unit in increasing order of the nuh_layer_id value. The following steps may be performed according to a predetermined condition:

When a sample of the track containing the first picture unit of a sample is marked as belonging to a sample group 'aud' with ols_idx and lower_ols_idx_inclusive corresponding to the target operating point, the AUD NAL unit within the 'aud' sample group may be placed into the AU as the first NAL unit of the AU.

When a sample in a track is marked as belonging to a sample group 'eos' with ols_idx, max_tid and lower_ols_idx_inclusive, corresponding to the target operating point, the EOS NAL units within the 'eos' sample group may be placed into the AU as follows i) For the first EOS NAL unit, the following applies:

Place the first (i.e., eos_position[0]+1)-th NAL unit of the sample into the reconstructed AU.

Place the EOS NAL unit with index 0 the within the 'eos' sample group (i.e., eosNalUnit[i]) into the AU.

ii) For the second to the last EOS NAL unit (i.e., EOS NAL units with index i where i is greater than 0), if present, the following applies:

Place the next (eos_position[i]−eos_position[i−1])-th NAL unit of the sample into the reconstructed AU.

Place the EOS NAL unit with index i within the 'eos' sample group (i.e., eosNalUnit[i]) into the AU.

iii) Place the remaining NAL units of the sample, if present, into the AU.

When a sample in a track is marked as belonging to a sample group 'eob' with ols_idx, max_tid, and lower_ols_idx_inclusive, corresponding to the target operating point, the EOB NAL unit within the 'eob' sample group may be placed into the AU after all NAL units of the AU (including the EOS NAL unit).

Only the picture units from the layers and sublayers that are in the target operating point may be included in the output bitstream.

According to Embodiment 1, the EOS sample group may include a plurality of EOS NAL units and its number information. Therefore, the access unit of the multi-layer structure may be correctly reconstructed.

Embodiment 2

Embodiment 2 of the present disclosure may be provided based on all items excluding Item 4 above. Implementation of Embodiment 2 may be relative to Embodiment 1.

According to Embodiment 2, unlike an existing EOS sample group, a plurality of EOS NAL units may be carried in one EOS sample group. Hereinafter, a repeated description of the existing EOS sample group described with reference to FIG. 10 will be omitted.

FIG. 13 is a view illustrating a syntax structure of an EOS sample group entry according to another embodiment of the present disclosure.

Referring to FIG. 13, an EOS sample group entry End-OfSequenceSampleEntry may include syntax elements ols_idx, max_tid, lower_ols_idx_inclusive, num_eos_nal_unit_minus1, delta_eos_position[i], and eosNalUnit[i].

The syntax elements ols_idx and max_tid may indicate the operating point, to which the EOS sample group applies.

The syntax element lower_ols_idx_inclusive may indicate whether the EOS sample group applies to only a specific operating point. For example, lower_ols_idx_inclusive equal to a second value (e.g., 0) may indicate that the EOS sample group applies only to the operating point with output layer set (OLS) index equal to ols_idx. lower_ols_idx_inclusive equal to a first value (e.g., 1) may indicate that the EOS sample group applies to any OLS with index from 0 to ols_idx, inclusive.

The syntax element num_eos_nal_unit_minus1 may indicate a value obtained by subtracting 1 from the number of EOS NAL units present in the EOS sample group.

The syntax element delta_eos_position[i] may be used to derive the value of eos_position[i] that specifies the index of the NAL unit within the current sample after which the i-th EOS NAL unit is placed. The NAL unit index may take into account only NAL unit that natively present in the current sample, excluding any other NAL unit(s) that may be inserted/placed in the current sample. Note that the first NAL unit in the current sample may be considered the 0-th NAL unit. eos_position[0] may be set to be equal to delta_eos_position[ 0]. eos position[i] for i greater than 0 may be set to be equal to eos_position[i−1]+delta_eos_position [i]. As such, the EOS sample group entry of FIG. 13 may be different from that of FIG. 12, which includes information indicating the position for insertion of the EOS NAL unit, in that it includes difference information for deriving the position for insertion of the EOS NAL unit.

Meanwhile, in an example, the current sample may also be mapped to 'aud' sample group and/or 'eob' sample group which cause AUD NAL unit and/or EOB NAL unit to be inserted into the sample or the reconstructed access unit. In this case, the eos position[i] may be based on the position of NAL unit prior to the insertion of AUD and/or EOB NAL units.

The syntax element eosNalUnit[i] may contain the i-th EOS NAL unit as specified in the standard document, e.g., ISO/IEC 23090-3 (VVC standard), in the sample group.

According to Embodiment 2, the EOS sample group may include a plurality of EOS NAL units and its number information. Therefore, the access unit of the multi-layer structure may be correctly reconstructed.

Embodiment 3

Embodiment 3 of the present disclosure may be provided based on Item 1, Item 2 and Item 6 above. Implementation of Embodiment 3 may be relative to the VVC file format specification.

According to Embodiment 3, unlike an existing EOS sample group, a plurality of EOS NAL units may be carried in one EOS sample group. In addition, information indicating a position for insertion of the EOS NAL unit may be excluded from the EOS sample group. Hereinafter, a repeated description of the existing EOS sample group described with reference to FIG. 10 will be omitted.

FIG. 14 is a view illustrating a syntax structure of an EOS sample group entry according to another embodiment of the present disclosure.

Referring to FIG. 14, an EOS sample group entry End-OfSequenceSampleEntry may include syntax elements ols_idx, max_tid, lower_ols_idx_inclusive, num_eos_nal_unit_minus1, and eosNalUnit[i].

The syntax elements ols_idx and max_tid may indicate the operating point, to which the EOS sample group applies.

The syntax element lower_ols_idx_inclusive may indicate whether the EOS sample group applies to only a specific operating point. For example, lower_ols_idx_inclusive equal to a second value (e.g., 0) may indicate that the EOS sample group applies only to the operating point with output layer set (OLS) index equal to ols_idx. lower_ols_idx_inclusive equal to a first value (e.g., 1) may indicate that the EOS sample group applies to any OLS with index from 0 to ols_idx, inclusive.

The syntax element num_eos_nal_unit_minus1 may indicate a value obtained by subtracting 1 from the number of EOS NAL units present in the EOS sample group.

The syntax element eosNalUnit[i] may contain the i-th EOS NAL unit as specified in the standard document, e.g., ISO/IEC 23090-3 (VVC standard), in the sample group.

The EOS sample group entry of FIG. 14, unlike the EOS sample group entries in FIGS. 12 and 13, does not include syntax elements (e.g., eos_position[i], delta_eos_position [i]) for the position for insertion of the EOS NAL unit. Accordingly, the bit size of the EOS sample group entry may be further reduced.

Meanwhile, some of implicit reconstruction processes of the above-described VVC bitstream may be modified as follows according to Embodiment 3.

When reconstructing an access unit, picture units (as specified in the standard document, e.g., ISO/IEC 23090-3 (VVC standard)) from samples having the same decoding time may be placed into the access unit in increasing order of the nuh_layer_id value. The following steps may be performed according to a predetermined condition:

When a sample of the track containing the first picture unit of a sample is marked as belonging to a sample group 'aud' with ols_idx and lower_ols_idx_inclusive corresponding to the target operating point, the AUD NAL unit within the 'aud' sample group may be placed into the AU as the first NAL unit of the AU.

When a sample in a track is marked as belonging to a sample group 'eos' with ols_idx, max_tid and lower_ols_idx_inclusive, corresponding to the target operating point, the EOS NAL units within the 'eos' sample group may be placed into the AU after all NAL units of the AU, excluding EOB NAL unit (if present).

When a sample in a track is marked as belonging to a sample group 'cob' with ols_idx, max_tid, and lower_ols_idx_inclusive, corresponding to the target operating point, the EOB NAL unit within the 'eob' sample group may be placed into the AU after all NAL units of the AU (including the EOS NAL unit).

According to Embodiment 3, the EOS sample group may include a plurality of EOS NAL units and its number information. In addition, information indicating the position for insertion of the EOS NAL unit may be excluded from the EOS sample group. Therefore, the access unit of the multi-layer structure may be correctly reconstructed while saving the number of bits.

Embodiment 4

Embodiment 4 of the present disclosure may be provided based on Item 1, Item 2 and Item 7 above. Implementation of Embodiment 4 may be relative to the VVC file format specification.

According to Embodiment 4, unlike an existing EOS sample group, a plurality of EOS NAL units may be carried in one EOS sample group. In addition, information indicating a position for insertion of the EOS NAL unit may be excluded from the EOS sample group. Hereinafter, a repeated description of the existing EOS sample group described with reference to FIG. 10 will be omitted.

The syntax and semantics of the EOS sample entry EndOfSequenceSampleEntry according to Embodiment 4 may be the same as that of Embodiment 3 described above with reference to FIG. 14.

Meanwhile, some of the implicit reconstruction processes of the VVC bitstream described above may be modified according to Embodiment 4. The implicit reconstruction process modified according to Embodiment 4 may be the same as that of Embodiment 3 except for the position for insertion of the EOS NAL unit. The position for insertion of the EOS NAL unit according to Embodiment 4 is as follows.

When a sample in a track is marked as belonging to a sample group 'eos' with ols_idx, max_tid, and lower_ols_idx_inclusive, corresponding to the target operating point, the EOB NAL unit within the 'eos' sample group may be placed into the AU after all NAL units from the sample excluding the EOB NAL unit (if present).

According to Embodiment 4, the EOS sample group may include a plurality of EOS NAL units and its number information. In addition, information indicating the position for insertion of the EOS NAL unit may be excluded from the EOS sample group. Therefore, the access unit of the multi-layer structure may be correctly reconstructed while saving the number of bits.

Hereinafter, a media file reception/generating method according to an embodiment of the present disclosure will be described in detail.

Figure 15:
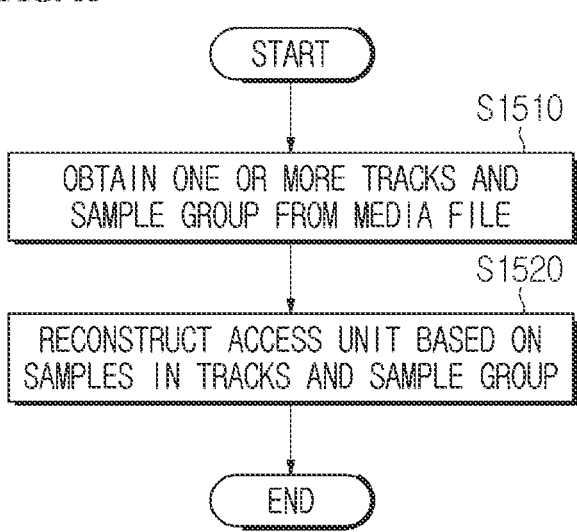
FIG. 15 is a flowchart illustrating a media file receiving method according to an embodiment of the present disclosure.

FIG. 15 is a flowchart illustrating a media file receiving method according to an embodiment of the present disclosure. Steps of FIG. 15 may be performed by a media file receiving apparatus. In an example, the media file receiving apparatus may correspond to the receiving apparatus B of FIG. 1.

Referring to FIG. 15, the media file receiving apparatus may obtain one or more tracks and a sample group from a media file received from the media file generation/transmission apparatus (S1510). In an example, the media file may have a file format such as ISO BMFF (ISO Base Media File Format), CMAF (Common Media Application Format) and the like.

The media file receiving apparatus may reconstruct an access unit based on samples in the tracks and the sample group.

The sample group may include a first sample group including end of sequence information of video data including the access unit.

The first sample group may include end of sequence (EOS) NAL units belonging to the first sample group and a first syntax element related to the number of EOS NAL units. The first sample group may have the syntax structure described above with reference to FIGS. 12 to 14. In this case, the EOS NAL units may correspond to the above-described syntax element eosNalUnit[i]. In addition, the first syntax element may correspond to the above-described syntax element num_eos_nal_unit_minus1.

In one embodiment, a value obtained by adding 1 to the first syntax element may indicate the number of EOS NAL units. The first syntax element may have an unsigned integer type (i.e., unsigned int). Therefore, since the value of the first syntax element may be greater than or equal to 0, the first sample group may include at least one EOS NAL unit.

In one embodiment, the EOS NAL units may be listed within a loop controlled based on the first syntax element. For example, as shown in FIGS. 12 to 14, the syntax element eosNalUnit[i] may be obtained from the EOS sample group in the order of NAL unit index i through a for-loop repeated num_cos_nal_unit_minus1+1 times.

In one embodiment, a maximum NAL unit index value of the EOS NAL units may be equal to the value of the first syntax element (e.g., num_eos_nal_unit_minus1).

In one embodiment, based on a sample in the track belonging to the first sample group, the EOS NAL units may be placed at a predetermined position within the access unit. At this time, the predetermined position may be determined to be a position after all NAL units of the sample excluding the end of bitstream (EOB) NAL unit within the access unit. Alternatively, the predetermined position may be determined to be a position after all NAL units of the access unit excluding the end of bitstream (EOB) NAL unit within the access unit.

Figure 16:
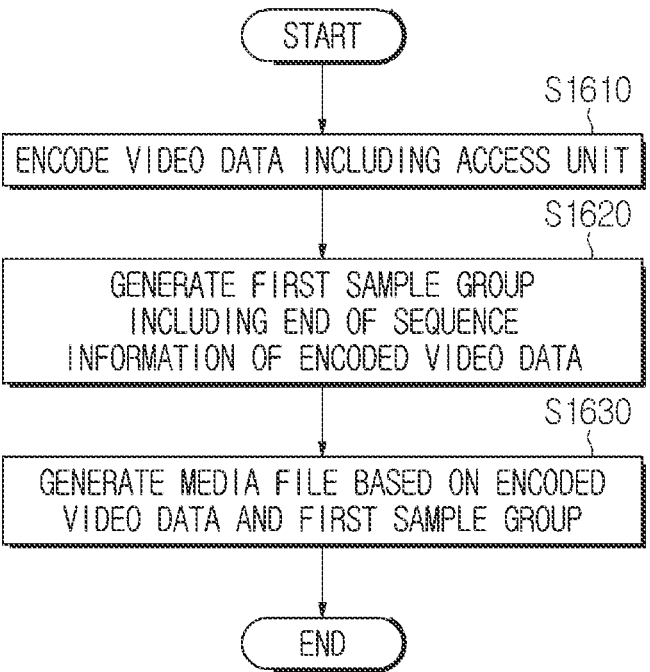
FIG. 16 is a flowchart illustrating a media file generating method according to an embodiment of the present disclosure.

FIG. 16 is a flowchart illustrating a media file generating method according to an embodiment of the present disclosure. Steps of FIG. 16 may be performed by the media file generating apparatus. In an example, the media file generating apparatus may correspond to the transmitting apparatus A of FIG. 1.

Referring to FIG. 16, the media file generating apparatus may encode video data including an access unit (S1610). In an example, the video data may be encoded through prediction, transformation and quantization processes according to the video codec standard, e.g., the VVC standard.

The media file generating apparatus may generate a first sample group including end of sequence information of the encoded video data (S1620).

In addition, the media file generating apparatus may generate a media file based on the encoded video data and the first sample group (S1630). In an example, the media file may have a file format such as ISO BMFF (ISO Base Media File Format), CMAF (Common Media Application Format) and the like.

The first sample group may include end of sequence (EOS) NAL units belonging to the first sample group and a first syntax element related to the number of EOS NAL units. The first sample group may have the syntax structure described above with reference to FIGS. 12 to 14. In this case, the EOS NAL units may correspond to the above-described syntax element eosNalUnit[i]. In addition, the first syntax element may correspond to the above-described syntax element num_eos_nal_unit_minus1.

In one embodiment, a value obtained by adding 1 to the first syntax element may indicate the number of EOS NAL units. The first syntax element may have an unsigned integer type (i.e., unsigned int). Therefore, since the value of the first syntax element may be greater than or equal to 0, the first sample group may include at least one EOS NAL unit.

In one embodiment, the EOS NAL units may be listed within a loop controlled based on the first syntax element. For example, as shown in FIGS. 12 to 14, the syntax element eosNalUnit[i] may be inserted (or encoded) in the EOS sample group in the order of NAL unit index i through a for-loop repeated num_eos_nal_unit_minus1+1 times.

In one embodiment, a maximum NAL unit index value of the EOS NAL units may be equal to the value of the first syntax element (e.g., num_eos_nal_unit_minus1).

In one embodiment, based on a sample in the track belonging to the first sample group, the EOS NAL units may be placed at a predetermined position within the access unit. At this time, the predetermined position may be determined to be a position after all NAL units of the sample excluding the end of bitstream (EOB) NAL unit within the access unit. Alternatively, the predetermined position may be determined to be a position after all NAL units of the access unit excluding the end of bitstream (EOB) NAL unit within the access unit.

According to embodiments of the present disclosure, a new 'eos' sample group design capable of carrying a plurality of EOS NAL units can be provided. Accordingly, the 'eos' sample group can work correctly even for VVC elementary streams with multiple layers.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 17:
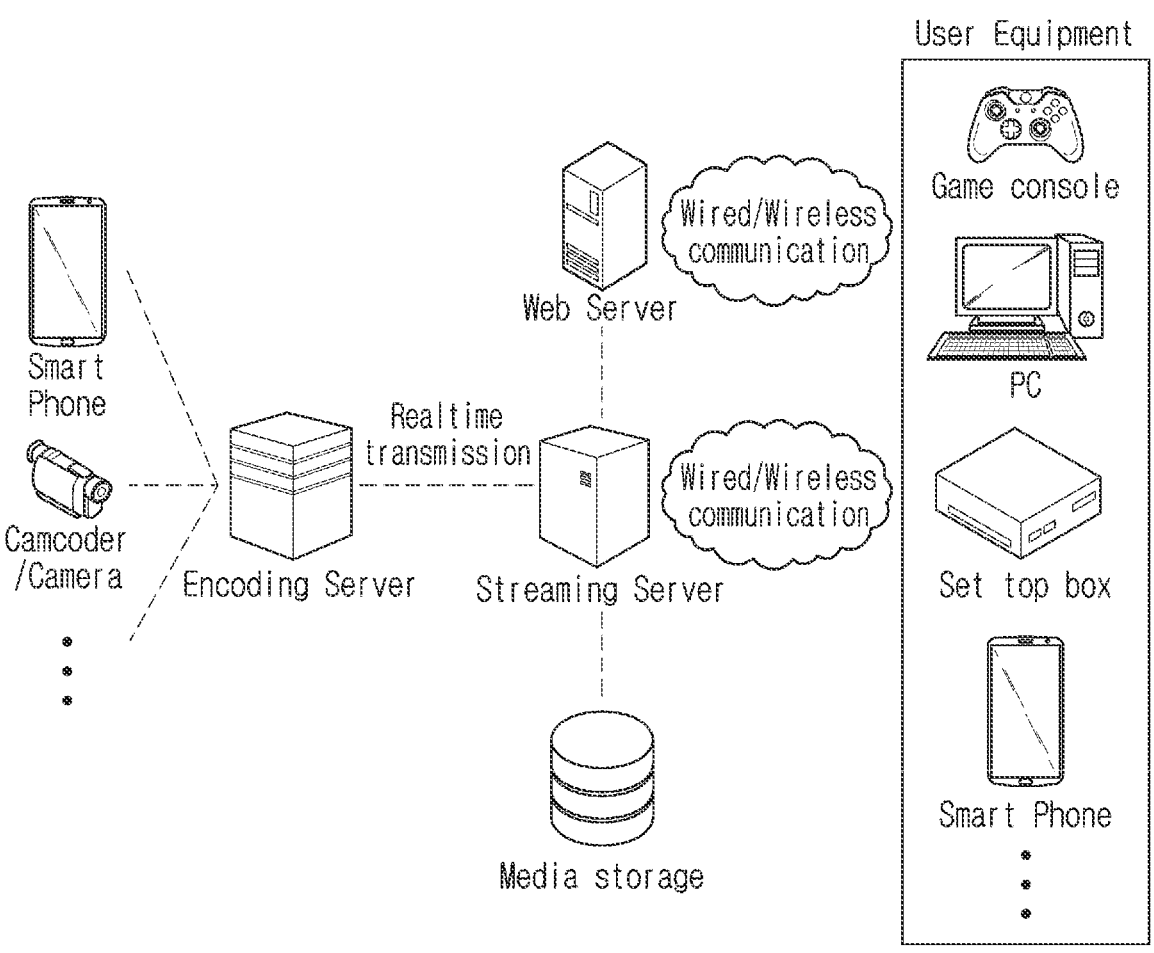
FIG. 17 is a view illustrating a content streaming system to which an embodiment of the present disclosure is applicable.

FIG. 17 is a view showing a content streaming system, to which an embodiment of the present disclosure is applicable.

As shown in FIG. 17, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to generate and transmit/receive a media file.

What is claimed is:

1. A media file receiving method performed by a media file receiving apparatus, comprising:

obtaining one or more tracks and a sample group from a media file; and reconstructing an access unit based on samples in the tracks and the sample group, wherein the sample group includes a first sample group including end of sequence (EOS) information of video data to which the access unit belongs, wherein the first sample group includes one or more EOS NAL units and a first syntax element related to the number of EOS NAL units, and wherein a maximum index value of the EOS NAL units is equal to a value of the first syntax element.

2. The media file receiving method of claim 1, wherein a value obtained by adding 1 to the first syntax element specifies the number of EOS NAL units.

3. The media file receiving method of claim 1, wherein the EOS NAL units are listed within a loop controlled based on the first syntax element.

4. The media file receiving method of claim 1, wherein, based on a sample in the track belonging to the first sample group, the EOS NAL units are placed at a predetermined position within the access unit.

5. The media file receiving method of claim 1, wherein the predetermined position is a position after all NAL units of the sample except for an end of bitstream (EOB) NAL unit, within the access unit.

6. A media file receiving apparatus comprising a memory and at least one processor, wherein the at least one processor is configured to:

obtain one or more tracks and a sample group from a media file; and reconstruct an access unit based on samples in the tracks and the sample group, wherein the sample group includes a first sample group including end of sequence (EOS) information of video data to which the access unit belongs, wherein the first sample group includes one or more EOS NAL units and a first syntax element related to the number of EOS NAL units, and wherein a maximum index value of the EOS NAL units is equal to a value of the first syntax element.

7. A media file generating method performed by a media file generating apparatus, comprising:

encoding video data including an access unit;

generating a first sample group including end of sequence (EOS) information of the encoded video data; and generating a media file based on the encoded video data and the first sample group, wherein the first sample group includes one or more EOS NAL units and a first syntax element related to the number of EOS NAL units, and wherein a maximum index value of the EOS NAL units is equal to a value of the first syntax element.

8. The media file generating method of claim 7, wherein a value obtained by adding 1 to the first syntax element specifies the number of EOS NAL units.

9. The media file generating method of claim 7, wherein the EOS NAL units are listed within a loop controlled based on the first syntax element.

10. The media file generating method of claim 7, wherein, based on a sample of the video sample belonging to the first sample group, the EOS NAL units are placed at a predetermined position within the access unit.

11. The media file generating method of claim 10, wherein the predetermine position is a position after all NAL units of the sample except for an end of bitstream (EOB) NAL unit, within the access unit.

12. A method of transmitting the media file generated by the media file generating method of claim 7.

13. A media file generating apparatus comprising a memory and at least one processor, wherein the at least one processor is configured to:

encode video data including an access unit;

generate a first sample group including end of sequence (EOS) information of the encoded video data; and generate a media file based on the encoded video data and the first sample group, wherein the first sample group includes one or more EOS NAL units and a first syntax element related to the number of EOS NAL units, and wherein a maximum index value of the EOS NAL units is equal to a value of the first syntax element.

* * * * *